(12) United States Patent
Beyer et al.

(10) Patent No.: US 8,255,246 B2
(45) Date of Patent: Aug. 28, 2012

(54) METHOD AND APPARATUS FOR CREATING COMPOUND DUE-TO REPORTS

(75) Inventors: Dirk Manfred Beyer, Walnut Creek, CA (US); Phillip Dennis Delurgio, Foster City, CA (US); James Frederic Drew, Redwood City, CA (US); Nathaniel Keith Folkert, Brooklyn, NY (US); Steven John Peter Hillion, San Francisco, CA (US); Michael Alexander Shwe, San Francisco, CA (US); Chad William Whipkey, Foster City, CA (US)

(73) Assignee: DemandTec, Inc., San Mateo, CA (US)

( * ) Notice: Subject to any disclaimer, the term of this patent is extended or adjusted under 35 U.S.C. 154(b) by 778 days.

(21) Appl. No.: 12/263,401

(22) Filed: Oct. 31, 2008

(65) Prior Publication Data

US 2010/0114625 A1    May 6, 2010

(51) Int. Cl.
  *G06Q 40/00*    (2006.01)
(52) U.S. Cl. .................. 705/7; 705/8; 705/9; 705/10
(58) Field of Classification Search .............. 705/7, 8, 705/9, 10
  See application file for complete search history.

(56) References Cited

U.S. PATENT DOCUMENTS

| | | | |
|---|---|---|---|
| 7,392,248 B2 | 6/2008 | Bakalash et al. | |
| 7,783,745 B1* | 8/2010 | Bhargava et al. | 709/224 |
| 2004/0267584 A1* | 12/2004 | Corman | 705/7 |
| 2005/0197889 A1 | 9/2005 | Prigogin et al. | |
| 2006/0241922 A1 | 10/2006 | Kaseda et al. | |
| 2007/0067195 A1 | 3/2007 | Fahner et al. | |
| 2008/0172286 A1* | 7/2008 | Ramanujan et al. | 705/10 |

OTHER PUBLICATIONS

International Search Report for PCT Patent Application No. PCT/US09/62816, Jun. 29, 2010, 3 Pgs.
Written Opinion of the International Searching Authority for PCT Patent Application No. PCT/US09/62816, Jun. 29, 2010, 9 Pgs.

* cited by examiner

*Primary Examiner* — Nga B. Nguyen
(74) *Attorney, Agent, or Firm* — Kang Lim

(57) ABSTRACT

Methods and apparatuses for computing a variance between two business metrics is described. In one embodiment, the method computes a variance for each of a first set of activities based on the corresponding reference state of that activity, wherein the variance for an activity is the change in contribution for that activity between the first and second business metrics and with each of the first set of activities having a reference value. Furthermore, the method computes a variance for each of a second set of activities based on the corresponding start and end values of that activity with each of the second set of activities having a start and end value.

20 Claims, 20 Drawing Sheets

Volume Contribution

△ Silk : Total US : 1/7/06 - 12/29/07

▽ Data

| | Volume | Percent of Total |
|---|---|---|
| 302 → Model Error | -340,748.50 | -0.35% |
| 304 → Base | 87,689,536.00 | 89.07% |
| 306A → Feature | 2,938,823.63 | 2.99% |
| 306B → Feature And Display | 200,320.56 | 0.20% |
| 306C → Display | 358,020.00 | 0.36% |
| 306D → TPR | 2,586,435.96 | 2.63% |
| 306E → TV | 2,596,041.43 | 2.64% |
| 306F → Print | 1,506,570.63 | 1.53% |
| 306G → Internet | 697,699.52 | 0.71% |
| 306H → FSI Coupon | 541,481.48 | 0.55% |
| 306I → Merchandising | 10,375.56 | 0.01% |
| 306J → PricePromoPriveLabel | -116,341.51 | -0.12% |
| 306K → PricePromo8thCont | -220,283.66 | -0.22% |
| 306L → CompetDistrib8thCont | 0.00 | 0.00% |
| 306M → CompetDistribPL | 0.00 | 0.00% |

| Driver 502 | Expected Value 504 | Reference Value 506 | Base 508 | TV 524A | Print 524B | Coupons 524C | Display 524D | Feature 524E | Compet 524F |
|---|---|---|---|---|---|---|---|---|---|
| TVGRP (510A) | 20 | 0 | 0 | 0 | 20 | 20 | 20 | 20 | 20 |
| %BaseVolumeOnDisplay (510B) | 10% | 0 | 0 | 10% | 10% | 10% | 0% | 10% | 10% |
| Display Price (510C) | $ 1.50 | $ 2.00 | $ 2.00 | $ 1.50 | $ 1.50 | $ 1.50 | $ 2.00 | $ 1.50 | $ 1.50 |
| %BaseVolumeOnFeature (510D) | 5% | 0 | 0 | 5% | 5% | 5% | 5% | 0% | 5% |
| Feature Price (510E) | $ 1.60 | $ 2.00 | $ 2.00 | $ 1.60 | $ 1.60 | $ 1.60 | $ 1.60 | $ 2.00 | $ 1.60 |
| CouponCirculation (510F) | 50,000 | 0 | 0 | 50,000 | 50,000 | - | 50,000 | 50,000 | 50,000 |
| RadioGRP (510G) | 70 | 0 | 0 | 70 | 70 | 70 | 70 | 70 | 70 |
| PrintCirculation (510H) | 1,000,000 | 0 | 0 | 1,000,000 | - | 1,000,000 | 1,000,000 | 1,000,000 | 1,000,000 |
| BasePrice (510I) | $ 2.00 | - | $ 2.00 | $ 2.00 | $ 2.00 | $ 2.00 | $ 2.00 | $ 2.00 | $ 2.00 |
| %BaseVolumeOnTrade_Compet (510J) | 10% | 10% | 10% | 10% | 10% | 10% | 10% | 10% | 0% |
| Predicted Volume (512) | 1000 | | 700 | 950 | 980 | 990 | 850 | 900 | 1005 |
| Raw Volume Contribution (514) | | | | 50 | 20 | 10 | 150 | 100 | -5 |
| ABS(Raw Volume Contribution) (516) | | | | 50 | 20 | 10 | 150 | 100 | 5 |
| Allocated Synergy (518) | | | | -3.73 | -1.49 | -0.75 | -11.19 | -7.46 | -0.37 |
| Final Volume Contribution (520) | | | | 46.27 | 18.51 | 9.25 | 138.81 | 92.54 | -5.37 |
| Decomposition (522) | | | 700 | 46.27 | 18.51 | 9.25 | 138.81 | 92.54 | -5.37 |

Figure 5

| Volume Totals (702) | Value (704) |
|---|---|
| Incremental Volume (706) | 300 |
| Total Raw Volume Contributions (708) | 325 |
| Synergy (710) | 25 |
| SumAbsRawVolumeContrib (712) | 335 |

Figure 7

METHOD AND APPARATUS FOR CREATING COMPOUND DUE-TO REPORTS

FIELD OF THE INVENTION

This invention relates generally to analysis of multi-dimensional data and more particularly to determining the effect of marketing activities on a business metric.

BACKGROUND OF THE INVENTION

A goal of business is to explain sales volumes results so as to understand how marketing activities affect the sales volumes, e.g., how much volume these marketing activities contributed to overall sales volume. These volume contributions are useful to calculate effectiveness measures for the activities such as volume per dollar spend or return on investment (ROI). Examples of such activities are activities directly controlled by the business (e.g., our TV advertising, a display for our products, a price increase for our products), activities controlled by another businesses in the market (e.g., a competitor's display, competitor's TV advertising, etc.), and/or the environment itself (e.g. a cold spell, a gas-price increase, etc.). For example, a company may want to know the approximate change in future sales, growth, and profit of the product or service based on these activities or changes in these activities. In addition, many companies want to know the effects of changes in these activities (e.g., marketing, advertising, pricing changes, etc.) on forecasted data (e.g., sales volume growth, profit, etc.) that are dependent on these activities.

In addition to being applied to a sales volume, these same techniques are used to interpret the effect of activities on other measurable business metrics, e.g., revenue, profit or market share, etc.

Typically, an analyst uses a mathematical model to estimate how these activities affect sales volumes in the past, or in the future. An example is a regression-based model. A regression-based model will typically relate the sales volumes to each of the activities via a coefficient. The analyst determines the coefficients based on the regression model (or another multivariate technique). The analyst then interprets the coefficient to assign rates of volume changes for each activity. For example, an analyst would determine that for one unit of an activity, such as promotion, would equal X percent or Y units change in sales volume. The analyst then multiplies this coefficient to the change in the amount of the activity, and a corresponding amount of volume is calculated. By doing this analysis for each of the activity/coefficient pairs, the analyst predicts and explains the effect of the activity on volume (or another relevant measurable business metric, like profit, etc.). In addition, in order to explain volume changes across time periods, the analyst would calculate volume contributions by activity for each time period and report the difference as explanation of volume change.

A problem with this approach is that the interpretation of the derived coefficients is dependent on the model that is used. For example, a price coefficient in a linear model and a multiplicative model for the same volume and activities will differ significantly from each other. This makes aggregation across products or channels for which different types of models were used difficult and requires volume interpreting algorithms specific to the model form used. Furthermore, the rates of volume change are dependent on the set of activities chosen. In addition, the results are inconsistent when using different sets of activities for the same time period. Moreover, some activities do not have natural reference values upon which to base the volume contribution calculations (e.g., price, distribution), and consequently, make it difficult to determine the effect of these activities on the volume and volume change across time periods.

SUMMARY OF THE DESCRIPTION

Methods and apparatuses for computing a variance between two business metrics is described. In one embodiment, the method computes a variance for each of a first set of activities based on the corresponding reference state of that activity, wherein the variance for an activity is the change in contribution for that activity between the first and second business metrics and with each of the first set of activities having a reference value, Furthermore, the method computes a variance for each of a second set of activities based on the corresponding start and end values of that activity with each of the second set of activities having a start and end value.

BRIEF DESCRIPTION OF THE DRAWINGS

The present invention is illustrated by way of example and not limitation in the figures of the accompanying drawings in which like references indicate similar elements.

FIG. 3 is a table illustrating one embodiment of a volume decomposition.

FIG. 5 is a table illustrating one embodiment of a volume decomposition calculation.

FIG. 7 is a table illustrating one embodiment of a synergy calculation.

FIG. 17 is a flow diagram of one embodiment of a process for calculating a compound due-to.

DETAILED DESCRIPTION

Figure 1:
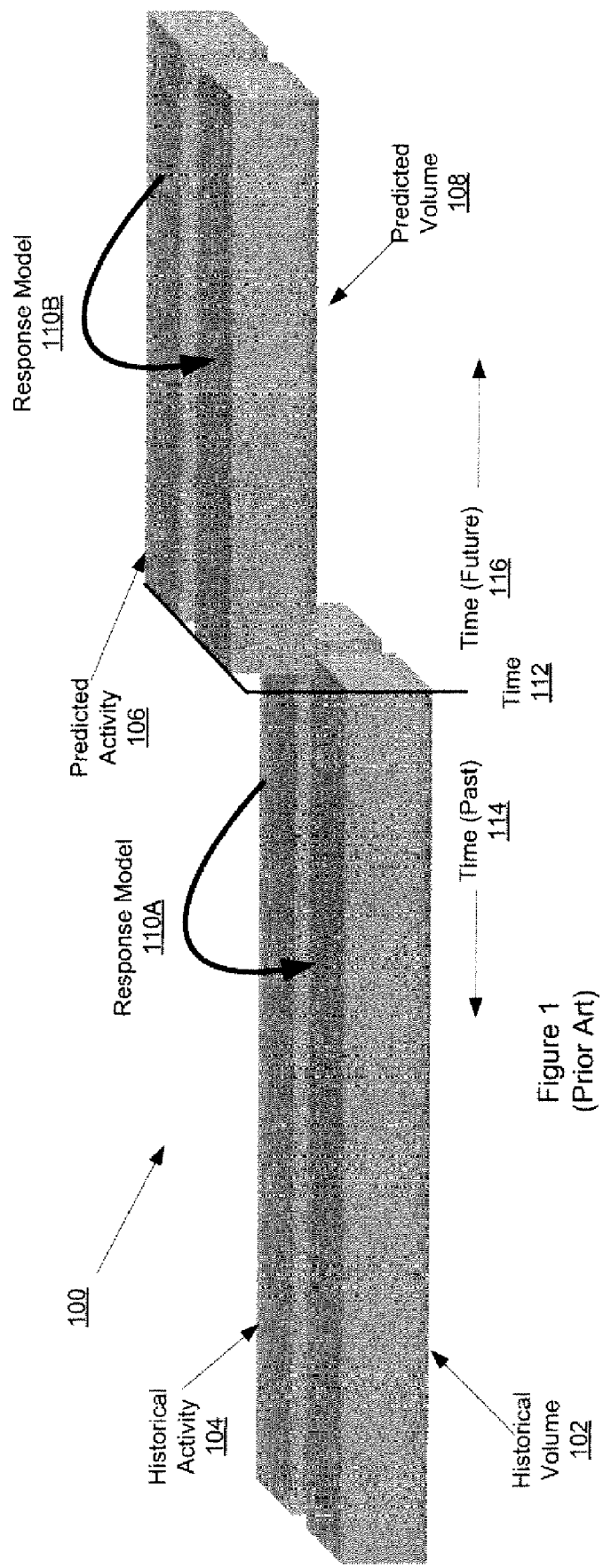
FIG. 1 is a processing block diagram illustrating one embodiment of a volume cube.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Method and apparatus to interpret a measurable business metric using a response model is described herein. In one embodiment, a response mode is used to calculate a measurable business metric (sales volume, revenue, profit or market share, etc.) In the response model, marketing activities are represented through a set of measurements. These measurements are called "drivers" of the activity. A set of drivers for all activities in the model is called a scenario. A scenario can represent an actual state of the world, i.e. a marketing plan that was actually executed in a real business environment or a hypothetical state of the world that is reflecting assumptions on marketing activities and the business environment for planning or analysis purposes.

In one embodiment, interpreting the business metric is performed by calculating a volume decomposition and/or a volume variance. Volume decompositions and volume variance reports (also called "due-to reports") are calculated for any scenario or pair of scenarios, real or hypothetical. The term "executed" value for a driver as the value the driver takes in the scenario, including scenarios that are hypothetical.

In one embodiment, a volume decomposition is calculated that is independent of the type of response model used to model a sales volume. A volume decomposition gives an indication of the contribution to the sales volume resulting from a set of marketing activities. In one embodiment, the volume decomposition for a set of activities is calculated by toggling drivers for each of those activities between an off and an on state. The off state or an activity corresponds to the scenario in which this activity is not executed (e.g. a promotion is not run or a price is not discounted). In this case, the activity does not add to the volume sold, and it is represented by its drivers taking a reference value. The activity's on state adds a contribution to the volume and is represented by the activity's drivers' executed value. The difference between the volume in the on and off states of an activity is called the raw volume contribution of the activity. In addition, in one embodiment, synergy is allocated to each of the volume contributions based on the absolute value of the volume contributions.

In another embodiment, a sequence of volume contribution reports are calculated at different levels of detail using a volume decomposition hierarchy that is based on an atomic decomposition level. The atomic decomposition level is a fundamental set of "indivisible" or "atomic" activities. Furthermore, a set of tree hierarchies is defined describing how to roll up the volume contributions from these atomic activities into aggregate activities. In one embodiment, the aggregate activities are formed into a hierarchy of volume decomposition levels that are internally consistent with the atomic decomposition level.

In a further embodiment, a hybrid due-to report is calculated that indicates, for a set of activities, the volume variance between two different sales volumes. In this embodiment, the volume variance is calculated by toggling each of these activities between a start and end value, where the start and end value are associated with one of the two different sale volumes. Furthermore, the change in base volume between the two different sales volumes is calculated using the first or second set of activities with a response model for the opposite set of activities. In one embodiment, the set of activities do not require a reference value for each of the associated drivers. In addition, in one embodiment, synergy is allocated to each of the volume variances based on the absolute value of the volume variances.

In a still further embodiment, a compound due-to report is calculated that determines the volume variance for a set of activities between two different sales volumes. In this embodiment, a difference decomposition is used to calculate the volume variance for a set of non-distribution activities that each has drivers with corresponding reference values. A reference value for drivers of an activity represents the activity in the off state and does not add a contribution to the volume. The phrase an "activity is off" is to mean hereinafter the drivers associated with the activity are in their reference value. Hybrid due-to is used to calculate the volume variance for a set of non-distribution activities that do not have drivers with reference values. Volume variance for distribution activities is calculated by subtracting the volume variance calculated for the set of non-distribution activities from one of the two difference sales volumes. In addition, in one embodiment, synergy is allocated to each of the volume variances based on the absolute value of the volume variances.

Volume Decomposition

In one embodiment, the state of a business' sales volume measured in a suitable unit (unit count, ounces, dollars, etc., (hereinafter referred to as "volume") at time t is described by a set of measurements $\{d_{p,t,l}^{i}\}_{i=1,\ldots,k}$ indexed by product p, time t, and location l. The set of measurements for a fixed i is called a driver. A driver is an action that call affect the volume. A market response model maps a history, e.g. the set of all the measurements for which $t \leq T$, to a volume $V_{T,p,l}$ at time T for product p and location l. The market response model can map a set of measurements that occurred in the past to a historical volume result or map a set of predicted measurements to a predicted volume.

In one embodiment, volume is represented as a volume data cube, with the dimensions being time, product and location. FIG. 1 is a block diagram illustrating one embodiment of volume cubes for historical and predicted sales volumes. In FIG. 1, a cube of historical volume 102 represents a time series of data formed into a multi-dimensional cube, such as $V_{T,p,l}$ above. Although in one embodiment, the dimensions of historical volume cube 102 are time, products and locations, alternate embodiments may have more, less and/or different dimensions. Historical volume 102 ends at a specific time 112. The portion of the cube to the left of actual historical volume 102 represents the very earliest volume available. Furthermore, in FIG. 1, response model 110A maps the historical activity 104 to historical volume 102. An activity is an action that can have an affect on the volume and can comprise one or more drivers, as described further below.

However, historical volume 102 and historical activity 104 do not always end at a specified time 108. In other embodiments, historical volume 102 and historical activity 104 are for any past time period and of varying length, such as a days, weeks, months, years, etc. Furthermore, historical volume information 102 and historical activity 104 can have different time lengths or represent overlapping periods of time.

In addition, response model 110B maps a predicted activity 106 to a predicted volume 108. In one embodiment, predicted volume 108 has the same dimensions as historical volume: time, product, and location. The predicted activity 106 is copied from the historical activity 104, derived from the historical activity 104, derived from some other product activity, generated from user input or a combination thereof. This embodiment is meant to be an illustration of predicted activity 106 and does not imply that predicted activity 106 always starts at present time 108. Other embodiments of predicted activity 106 can be for any future time period and of varying length, such as a days, weeks, months, years, etc. Furthermore, actual activity 104 and predicted activity 106 can have different time lengths. In one embodiment, response model 110B is the same as or different than response model 110A.

An analyst uses the response model to estimate the effect of activities on volume. In one embodiment, an activity is described by drivers that each can have a reference value and all executed value. The reference value for an activity's drivers represents the activity in the "off" state, meaning the activity adds no contribution to the volume. Some activities' drivers do not have a meaningful off state and, therefore, no reference value (e.g. number of stores the product is distributed in, price, etc.). An executed value for an activity's drivers is a value that adds a positive or negative contribution to the volume. This represents the activity in the "on" state. An activity is characterized by a subset of drivers and by a scope of those drivers that is affected by the activity.

In one embodiment, the business' sales volume is represented as the superposition of the base volume (e.g., no promotions, a reference price for all products, average temperature, no advertising, etc.) and an additional volume due to an execution of the set of activities. These activities are activities of the business (e.g., TV advertising, a display for products, a price increase for products), other businesses in the market (e.g., a competitors display, competitors TV advertising, etc.) and/or the environment itself (e.g., a cold spell, a gas-price increase, etc.). An activity is characterized by a deviation of some of the drivers from their reference values for some combinations of products, locations and time periods. In this embodiment, an activity is therefore described by a set of drivers and a scope.

In one embodiment, the response model is expressed as a mathematical function of a base volume and the volume due to set of activities, as illustrated in Eq. (1):

$$\text{Volume} = Volume_{Base} + \sum_{i=1}^{N} \beta_i + f_i(Activity_i) \quad (1)$$

where Volume is the historical or predicted volume, $Volume_{Base}$ is the base volume, $B_i$ is the coefficient for $Activity_i$, $f_i$ is the function applied to the $Activity_i$, and $Activity_i$ is the activity affecting Volume such as, for example, TV advertising, product display, price increase, etc. While in one embodiment, function $f_i$ is a linear function, in alternative embodiments, function $\theta_i$ is another function known in the art (e.g., logarithmic functions, exponential functions, algebraic functions, etc.) and/or combinations thereof, For example, in one embodiment, the natural logarithm is used in multiplicative models to represent a constant elasticity model, normalizations are used to model pooling and shrinking across products and locations, adstock is used to model delayed impact of a marketing action on a behavior (e.g., TV), and saturation is used to model diminishing returns (or fatigue) of a marketing action on a behavior). In addition, in one embodiment, each activity is modeled as a function of one or more drivers $$Activity_i = g_i(d_1, d_2, \ldots, d_n) \quad (2)$$

where $Activity_i$ is the activity affecting Volume, $g_i$ is the function transforming drivers $(d_1, d_2, \ldots d_n)$ to $Activity_i$, and $(d_1, d_2, \ldots, d_n)$ are the drivers affecting Volume. For example, in one embodiment, the activity price comprises drivers NoPromoPrice, the price charged when there is no promotion in a given week and AvgNoPromoPrice, the average price in a given year for product sold without promotion. As another example, in one embodiment, the activity marketing comprises television advertising (TV), Furthermore, in one embodiment, a driver is used for one or more activities as described below.

While in one embodiment Eqs. (1) and (2) are used to calculate a volume, in alternate embodiments, Eqs. (1) and (2) are used for other purposes (scenario analysis, forecasts, insight generation, financial predictions, etc.). Eqs. (1) and (2) comprises one embodiment of the response model. Furthermore, the response model can have different embodiment than Eqs. (1) and (2). For example, an alternative embodiment of the response model is a generalized parameterized form (Eq. (3)):

$$\text{Volume} = f(A_1 A_2, \ldots A_n, \vec{\beta}) \quad (3)$$

where Volume is the historical or predicted volume, $\hat{f}$ is the model form, $A_1, A_2, \ldots, A_n$ is the set of activities, and $\vec{\beta}$ is the vector of coefficients. This includes any calculation that takes measures of activities as inputs and returns a number describing a measure of sales volume. In addition, the response model is expressed as a velocity model. Eq. (4):

$$\frac{\text{Volume}}{ACV} = \tilde{f}(A_1, A_2, \ldots, A_n) \quad (4)$$

where Volume is the historical or predicted volume, $\hat{f}$ is the model form, $A_1, A_2, \ldots, A_n$ is the set of activities, and ACV is all-commodity volume, a measure of size of a given location. The response model can also be modeled as a promotion condition model, as in Eqs. (5) and (6):

$$\text{Volume} = \sum_{PromoCond} Volume_{PromoCond}, \quad (5)$$

PromoCond∈{Feature,Display,FeatureDisplay,TPR, NoPromo}

$$Volume_{PromoCond} = ACV_{PromoCond} \cdot f_{PromoCond}(A_1, A_2, \ldots A_n) \quad (6)$$

where Volume is the historical or predicted volume, $Volume_{PromoCond}$ is the volume for that promotion condition, f is the model form, $A_1, A_2, \ldots, A_n$ is the set of activities, $ACV_{promoCond}$ is the all-commodity volume of those locations that had the specified promotion condition, and Promo- Cond is type of promotional condition consisting of Feature, Display. Feature+Display, temporary price reduction (TPR), and/or no promotion.

Figure 2:
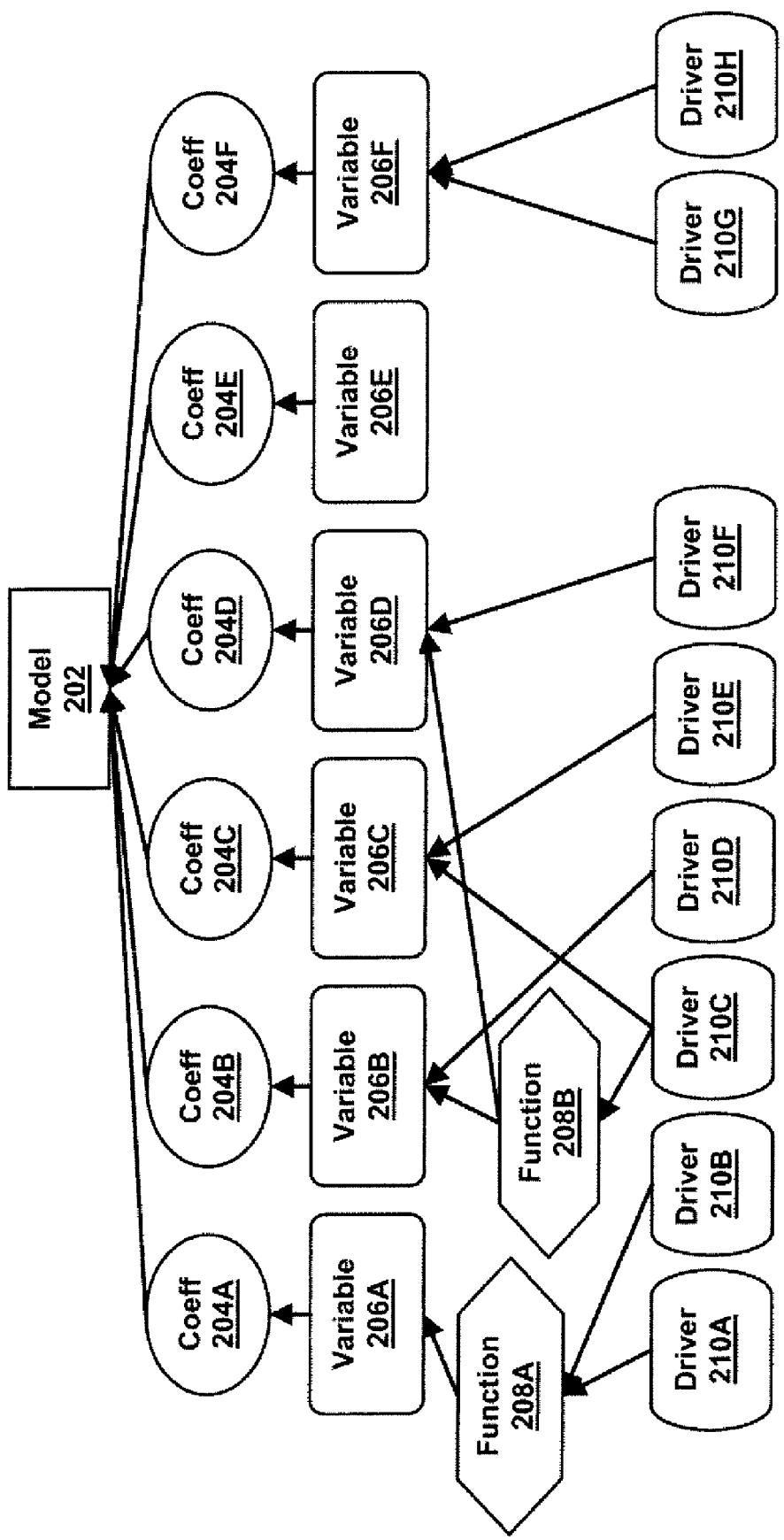
FIG. 2 is a processing block diagram illustrating one embodiment of a model structure.

FIG. 2 is a processing block diagram illustrating one embodiment of a response model structure. While in one embodiment, FIG. 2 is a general structure of the response model, in alternate embodiment, the response model structure is a model structure known in the art (e.g. parameterized form, velocity model, promotion condition model, neural network model, agent based model, etc.). In FIG. 2, model 202 comprises coefficients 204A-F, variables 206A-F, functions 208A-B, and drivers 210A-H. In one embodiment, a variable represents one of the set of activities affecting the modeled volume. In another embodiment, a variable represents multiple activities or an activity might be represented by multiple variables. In one embodiment, model 202 is a sequence of calculations in which variables 206A-F are combined with coefficients 204A-F to calculate a volume. Variables 206A-F are composed of drivers 210A-H and functions 208A-B using those drivers 210A-H. For example, variable 206A comprises a function 208A of drivers 210A and driver 210B. Furthermore, variable 208B comprises driver 210D and a function 208B of driver 210C. In addition, variable 208C comprises driver 210C and 210E. Variable 208D comprises driver 210F and a function 208B of driver 210C. Variable 206F comprises drivers 210G and 210H. In addition, a variable does not need to be comprised of drivers. For example, variable 206E is not dependent on any drivers. In one embodiment, a variable of this type is a constant.

In one embodiment, each driver has a scope that is the set of products and locations for which the specific driver (measurement) enters the model. In one embodiment, dec default scope of a driver entering a model is the scope of the model itself, e.g., the price for ProductA in Location1 is part of a model for ProductA in Location1. In another embodiment, the same driver can also be used for ProductB in Location1 in a model for ProductA in Location1 to describe the effect of ProductB's price on ProductA. Furthermore, the scope of a variable is based on the scopes of the drivers that are part of that variable.

The structure of variables and drivers in the models reflects the activities that the model is designed to take into account for modeling historical and predicted volumes. In one embodiment, the following assumptions on how marketing activities are reflected in each model:

1. Each model has a given set of activities of interest.
2. Activities are described by a set of drivers with a scope associated with each driver.
3. Each driver has a single "off" state in each Product/Week/Location. The driver's off state is also referred to as the driver's reference value.
4. An activity can be on or off. If an activity is off, all drivers used to describe this activity are in their off state. If the activity is on, at least one driver is not at its reference value.
5. The state of the model in which all activities are off is the base state. The volume associated with the base state is the base volume.

In one embodiment, the same driver is used for different variables (and/or activities) and has different scopes. As an example, driver 210C is used for variables 206B and 206D. In this example, driver 210C would have one scope for variable 206B and another scope for 206D.

An example of the relationship between an activity (and/or variable) and individual drivers is the activity end cap display. End cap display represents the marketing activity of placing a product at the end of a supermarket isle in high traffic areas of the store. In one embodiment, the end cap activity is represented as a function of the percentage of stores that have an end cap display for a product and the price (usually a decrease in price) associated with that product on display. The drivers for this activity are the store percentage having the display and the promotional price. The corresponding off state for this activity is zero store percentage and a price corresponding to the base price (e.g., no price decrease).

With these defined set of activities and associated drivers, the response model described above allows an analyst to compute a base volume and the volume resulting from the set of activities used in the model. In addition, this model allows an analyst to compute a contribution to the volume from each of the set of activities. Each activity can have a positive, negative, or negligent effect on the volume. For example, discounting the price of a product could have a positive effect on volume. Conversely, raising the price on that same product could have a negative effect on volume. Computing volume contributions for each of the set of activities is called a volume decomposition. A volume decomposition allows the analyst to determine which of the set of activities gave the greatest or least amount of volume contribution.

FIG. 3 is a table illustrating one embodiment of a volume decomposition. In FIG. 3, the base volume 304 is 89.07% of the total volume. In this embodiment, the activities 306A-M make up 11.42% of the total volume with the remaining 0.35% attributed to model error. Each of activities 306A-M gives different contributions to the total volume. For example, feature activity 306A gives the most contribution at 2.99%, with TV advertising 306E and temporary price reduction (TPR) 306D also giving contributions to the total volume above 2%. Conversely, some activities give no or little contribution to the total volume, such as feature and display 306B, competDistrib8thCont (the distribution of a specific competitor) 306L, and competDistribPL (the distribution of Private Label products) 306M.

In one embodiment, model error 302 is the difference between the calculated total volume (including all activities and allocated synergy) and the actual volume. Model error 302 is reported as a separate category or is included into the base volume, set of activities, and/or a combination thereof.

Figure 4:
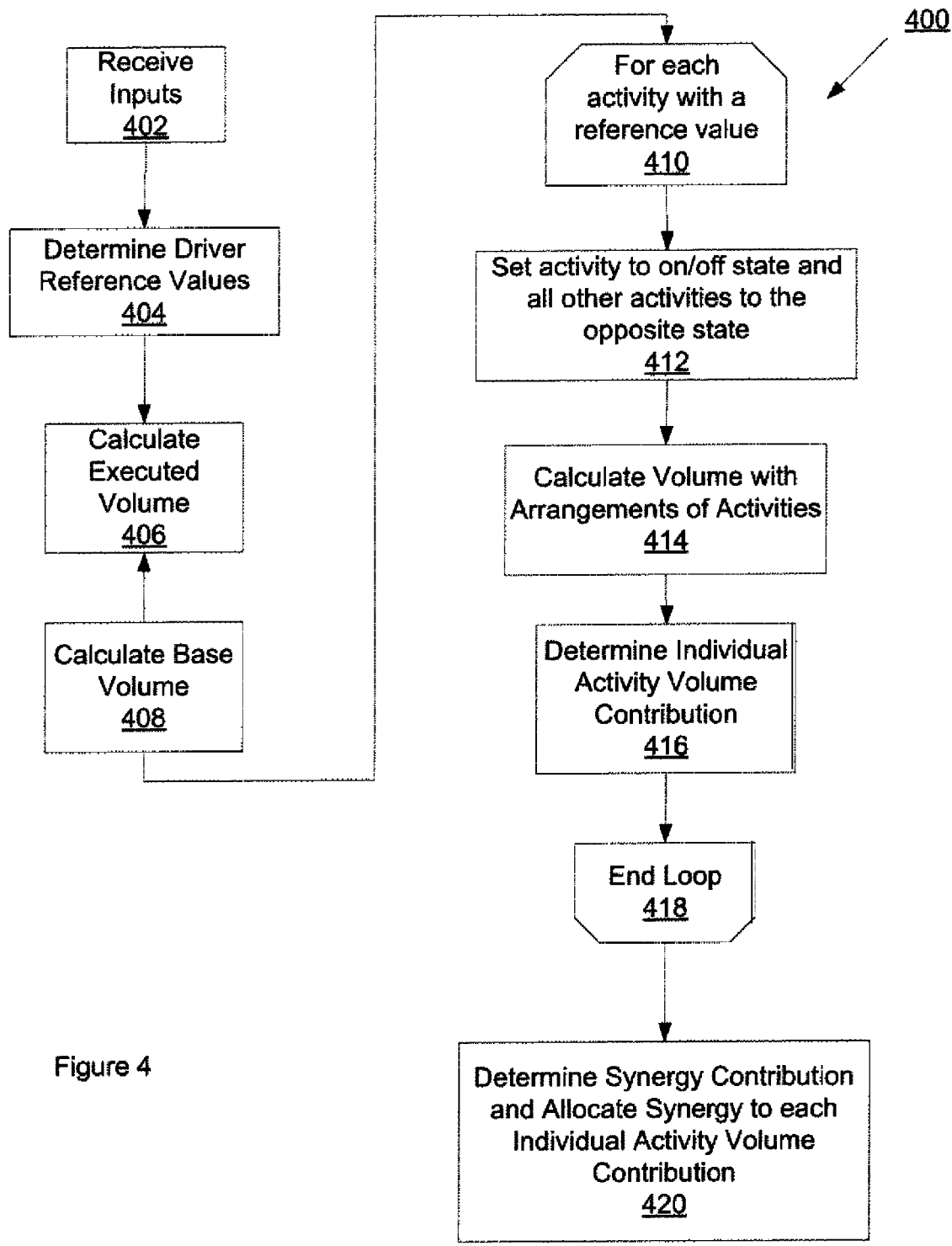
FIG. 4 is a flow diagram of one embodiment of a process for calculating a volume decomposition including synergy allocation.

FIG. 4 is a flow diagram of one embodiment of a process 400 for calculating a volume decomposition that includes synergy allocation. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 400 is performed by data processing system 1800 of FIG. 18.

Referring to FIG. 4, at processing block 402, the process begins by processing logic accessing inputs for the volume decomposition calculation. In one embodiment, these inputs comprise the response model, the parameters of the model, the set of activities that contributed to the calculated volume, and a set of drivers associated with each of the activities. In one embodiment, the input corresponds to the response model, coefficients, functions, and set of activities and drivers as described above with respect to FIG. 2.

At processing block 404, processing logic determines the driver reference values for each of the set of activities. This is done through user input, rules based on historical driver values or any other logic based on historical data or default values. As per above, the driver reference values represent the off state of the driver. In addition, the off state for an activity means that this activity will yield no additional contribution to the volume. An activity in the off state is defined as having all the drivers comprising that activity will be in the off state.

At processing blocks 406 and 408, processing logic calculates the base and predicted volume using the response model and the activities with the reference and executed values of these activities, respectively. In one embodiment, processing logic calculates the base volume by setting each of the activities to the off state and using the driver reference values for the base volume calculation. As per above, the base volume represents the sales volume if the business did not do any of the activities for the product(s), location(s) and/or time period(s) represented in the volume cube. Furthermore, processing logic calculates the predicted volumes using the executed driver values. In one embodiment, the executed driver values are the driver values that were actually used or planned to be used.

In one embodiment, with the accessed response model, processing logic calculates different scenarios with certain activities on and certain activities off. The difference in predicted volume that results from switching an activity on/off is the raw volume attributed to those activities that are switched. Volume attributed to a set of activities may not be the sum of the volumes attributed to the individual activities, This is due to non-linearities of the volume response existing in real life and captured in the model. Different activities might "help" or "hurt" other activities and generate more or less volume if executed together than if executed separately. The difference between the predicted volumes is called synergy and is either reported separately or allocated to the individual activities. Calculating the synergy is further described at processing block 420 below.

Processing logic executes a processing loop (processing blocks 410-418) to calculate a raw volume contribution for each activity. At processing block 412, processing logic sets one of the activities to the opposite state of all the other activities. In one embodiment, processing logic sets the drivers for one of the activities to their off state and sets all the other activities' drivers to the on state. In this embodiment, processing logic calculates the raw volume contribution for the activity using a subtractive scheme, described below. In another embodiment, processing logic sets the drivers for one of the activities to the on state and sets all the other activities to the off state. In this embodiment, processing logic calculates a raw volume contribution for the activity using an additive scheme, described below.

At processing block 414, processing logic calculates the raw volume contribution of an activity using one of the additive and subtractive schemes. Using the inputted set of activities $\{a_1, a_2, \ldots a_n\}$, indicate that activity i is on such that the drivers associated with the activity take their executed values. Respectively, denote by $a_i^0$ that activity i is off such that the drivers associated with the activity take their reference values for the associated scopes. In one embodiment, processing logic calculates raw volume contributions using an additive scheme. In the additive scheme, processing logic calculates the volume difference for the scenarios in which only a single activity is on and the scenario in which all activities are off. The difference is the raw volume contribution attributed to that activity, as shown in Eq. (7).

$$\text{Volume}^{add}(a_i) = \text{Volume}(\{a_1^0, \ldots, a_{i-1}^0, a_i^1, a_{i+1}^0, \ldots, a_n^0\}) - \text{Volume}(\{a_1^0, \ldots a_{i-1}^0, a_i^0, a_{i+1}^0, \ldots, a_n^0\}) \quad (7)$$

In another embodiment, processing logic calculates the raw volume contribution using a subtractive scheme. In the subtractive scheme, processing logic calculates the volume difference with all activities on with the volume predicted in the case that a single activity is off as shown in Eq. (8):

$$\text{Volume}^{Subtr}(a_i) = \text{Volume}(\{a_1^1, \ldots, a_{i-1}^1, a_i^1, a_{i+1}^1, \ldots, a_n^1\}) - \text{Volume}(\{a_1^1, \ldots, a_{i-1}^1, a_i^0, a_{i+1}^1, \ldots, a_n^1\}) \quad (8)$$

The processing loop ends at processing block 418.

At processing block 420, processing logic determines the synergy contribution and allocates a portion of that synergy to each individual activity raw volume contribution. Synergy results from the non-linearities in the model. To determine the synergy, processing logic calculates the sum of the activity raw volumes from processing block 410-418 and calculates an incremental volume. The incremental volume from all activities combined is the difference of the predicted volume when all activities are active and the predicted volume when all of them are inactive. It is independent of the method by which individual activities' raw volume contributions are calculated using Eq. (9):

$$\text{IncVolume} = \text{Volume}(\{a_1^1, a_2^1, \ldots, a_n^1\}) - \text{Volume}(\{a_1^0, a_2^0, \ldots, a_n^0\}) \quad (9)$$

In one embodiment, due to the non-additivity of the world and the model representation of it, it can that the incremental volume does not equal the sum of the raw volume contributions, Eqs. (10a) and (10b):

$$IncVolume \neq \sum_i Volume^{add}(a_i) \quad (10a)$$

$$IncVolume \neq \sum_i Volume^{subtr}(a_i) \quad (10b)$$

The difference of incremental volume and total raw volume contribution is defined as synergy, Eqs. (11a) and (11b):

$$Synergy^{add} = IncVolume - \sum_i Volume^{add}(a_i) \quad (11a)$$

$$Synergy^{subtr} = IncVolume - \sum_i Volume^{subtr}(a_i). \quad (11b)$$

Synergy means that some or all marketing activities result in "the sum being grater than the parts." This means that the execution of multiple activities in concert (at least as long as these activities make positive contributions to volume) can generate a volume that is higher (or lower) than the sum of the volumes generated by individual execution of all activities. Therefore, additive synergy tends to be positive. For the same reason, subtractive synergy tends to be negative since turning off an individual activity not only loses the lift from that activity but also makes the remaining activities somewhat less effective.

In one embodiment and depending on the relative size of incremental volume to total volume and the relative lift of different activities, the choice of decomposition scheme has an impact on raw incremental volume. For example, the subtractive method can allocate a relatively higher volume contribution to the "small" effects than the additive method.

Furthermore, at processing block 420 and in one embodiment, processing logic allocates the computed synergy to each of the raw volume contributions. By allocating the synergy to the raw volume contributions, processing logic can calculate a volume contribution for an activity that models the actual volume contribution. In one embodiment, processing logic allocates synergy for each activity in the set of activities. In this embodiment, the calculated synergy is the result of the interaction of all the activities. In another embodiment, processing logic excludes one or more of the activities from the synergy allocation. In this alternative embodiment, an activity that is excluded from the synergy allocation will have the final volume contribution equal to the raw volume contribution. For example, an activity is excluded if the activity enters the response model in an additive fashion (e.g., supplemental volume) or activities that will be combined with base volume later to form the reported base volume.

In alternate embodiments, amongst those activities included into the synergy allocation, synergy is allocated based on different formulae. Examples are proportionate allocation, allocation proportionate to the absolute size of a volume contribution, allocation in equal portions, or any allocation scheme that results in the sum synergy portions allocated to each activity being equal to total synergy Before discussing allocation of synergy, it is useful to give an example of an overall volume decomposition calculation. In one embodiment, processing logic allocates synergy with the following properties: raw and final volume contributions have the same sign (no sign flipping); final volume contributions be as close to the raw contributions a possible; and the relative size of final contributions be as close as possible to the relative size of the raw contributions. Allocating synergy with this embodiment is further described in FIG. 6, below.

FIG. 5 is a table illustrating one embodiment of a volume decomposition calculation using the subtractive scheme. In FIG. 5, processing logic computes a volume decomposition 522 using activities 524A-F. Activities 524A-F comprise TV advertising 524A, print advertising 524B, coupons 524C, display 524D, feature 524E, and competition 524F. Processing logic uses a response model (not shown) that models this market volume using drivers 510A-J. Each of the activities 524A-F comprises one or more of drivers 510A-J. For example, TV advertising 524A comprises TV gross ratings points driver 510A, print advertising 524B comprises print circulation driver 510H, coupons 524C comprises coupon circulation driver 510F, display 5241D comprises percent base volume on display driver 510B and display price driver 510C, feature activity 524E comprises percent base volume on feature driver 5101 and feature price driver 510E, and competition activity 524F comprises percent volume on trade competition driver 510J. As illustrated in FIG. 5, activities 524A-F comprise one or more of drivers 510A-J. However, not all of drivers 510A-J are included in one of activities 524A-F. For example, base price driver 510I and radio gross ratings point 510G are not included in one of activities 524A-F. Instead, these drivers add to the base volume 508 and are not changed during a simulation to determine the raw volume contribution of activities 524A-F.

Furthermore, as described above, each of drivers 510A-J has a reference value and an executed value. Processing logic uses the executed value to calculate the expected volume, whereas processing logic uses drivers 510A-J reference values to calculate the base volume. Processing logic uses either the reference or expected values at times to calculate an activity's raw volume contribution. Using these values, processing logic calculates an expected volume of 1000 and a base volume of 700. The incremental volume is 300.

Processing logic uses this model described above to calculate a raw volume contribution for each of activities 524A-F. For example, for TV advertising 524A, processing logic calculates a volume with TV gross rating point driver 510A changed from its expected value of 20 to the reference value of 0. This scenario gives a predicted volume of 950, meaning that the raw volume for TV advertising 524A is 50. For the print activity 524B, processing logic turns off the print activity driver 510H to 0 from 1,000,000. This calculation gives a raw volume contribution for print activity 524B of 20. Similarly, processing logic calculates raw volume contributions for coupons 524C, display 5249, feature 524E, and competition 524F of 10, 150, 100, and −5, respectively, using the reference values for the associated driver illustrated in FIG. 5.

From the raw volume contributions above, processing logic calculates the absolute value of the raw volume contributions, which are 50, 20, 10, 150, 100, and 5 for activities 524A-F, respectively. As will be described below with respect to FIG. 5B, the allocated synergy for each activity is −3.73, −1.49, −0.75, −11.19, −7.46, and −0.37 for activities 524A-F, respectively. This leads to a final volume contribution of 700 for base volume 508 and activity 524A-F contributions of 46.27, 18.51, 9.25, 138.81, 92.54, and −5.37, respectively.

Figure 6:
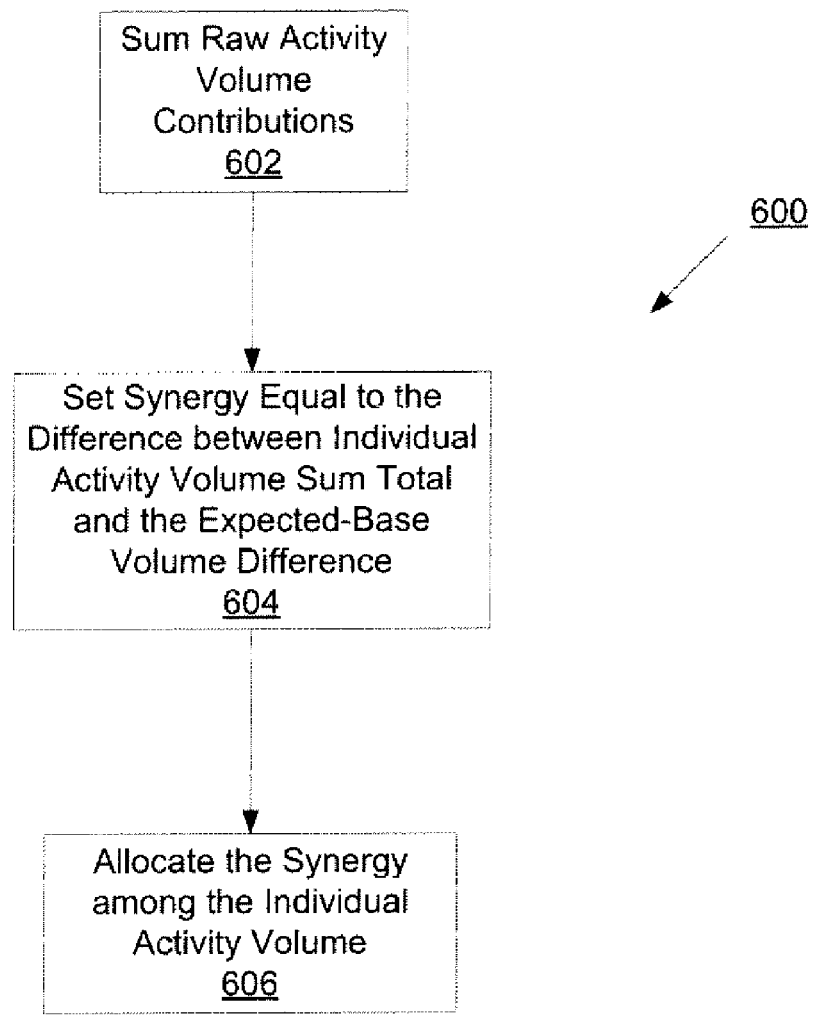
FIG. 6 is a flow diagram of one embodiment of a process for calculating synergy allocations.

In the volume decomposition described above, processing logic allocated synergy based on the absolute values of the raw volume contributions. FIG. 6 is a flow diagram of one embodiment of a process 600 for calculating synergy allocations based on the absolute value of the raw volume. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 600 is performed by data processing system 1800 of FIG. 18.

In FIG. 6, at processing block 602, the process begins by processing logic summing the activity raw volume contributions calculated in FIG. 4, processing blocks. Processing logic sets the amount of synergy equal to the incremental volume minus the raw volume sum at processing block 604.

At processing block 606, processing logic allocates a portion of the calculated synergy for each of the activity volume contributions based on the absolute values of the raw volume contributions. In one embodiment, let $V_1, V_2, \ldots, V_n$ be the raw volume contributions of those activities that are being allocated a portion of the calculated synergy and let S be the calculated synergy to be allocated. In one embodiment, the final volume contribution for each activity i is computed using Eq. (12):

$$V_i^{Final} = V_i + \frac{|V_i|}{\sum_{j=1}^{n} |V_j|} \cdot S. \tag{12}$$

where $V_i^{Final}$ is the final volume contribution for an activity i, $V_i$ is the raw volume contribution for activity i, and S is the total calculated synergy. Furthermore, because synergy S satisfies the inequality, $$-\sum_{j=1}^{n} |V_j| \leq S \leq \sum_{j=1}^{n} |V_j|, V_i^{Final}$$

and $V_i$ will have the same sign. In addition, the raw contributions with the same sign are scaled by the factor with a relative size, preserving volume contribution relative size.

As an example of synergy allocation, FIG. 7 is a table illustrating one embodiment of a synergy calculation. The volume numbers in FIG. 7 are derived from the expected/base volumes and volume contributions in FIG. 5. For example, incremental volume 706 has a value of 300 that is the difference of the expected volume 704 and the base volume 508. Summing the raw volume contributions 758 gives a total of 325. The difference between this sum and the incremental volume is 25, which is the synergy 710. In one embodiment, synergy 710 is allocated to the raw volume contribution using Eq. (7) above.

Figure 8B:
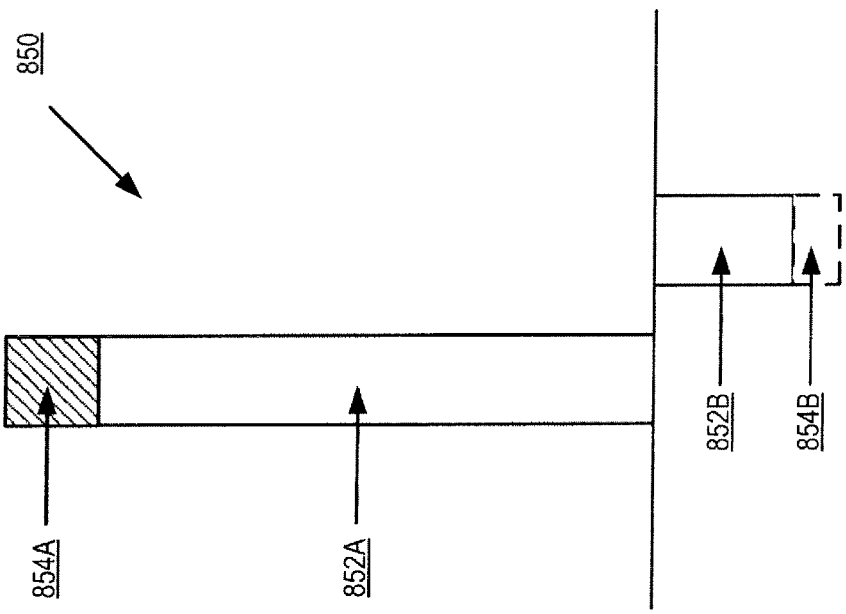
FIG. 8AB are block diagrams illustrating synergy allocation by raw value scaling and absolute value scaling.
Figure 8A:
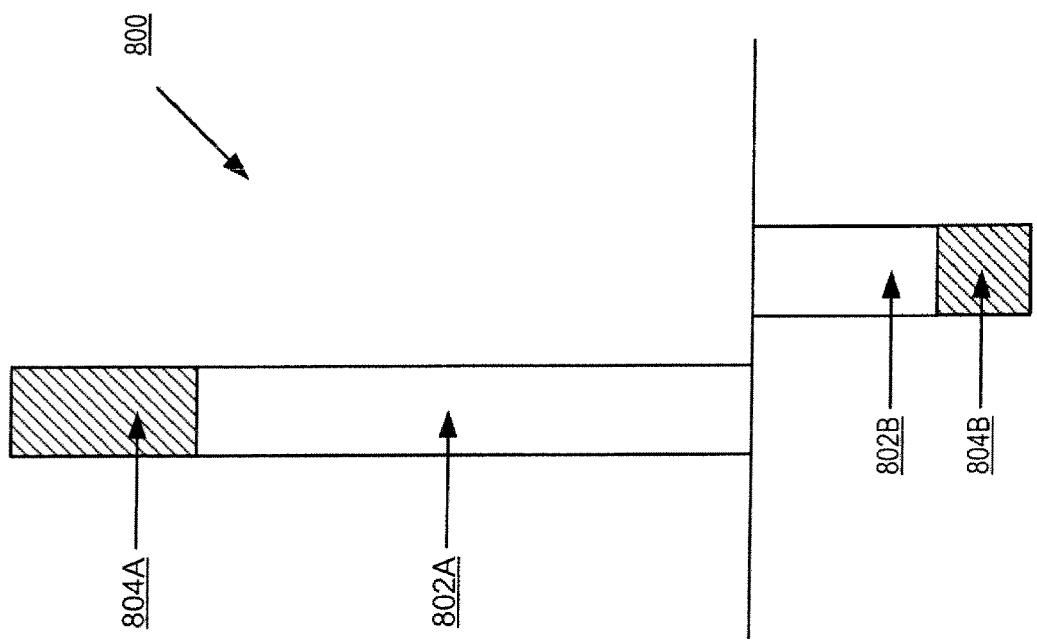

As described above, processing logic allocates the synergy based on the absolute value of the raw volume contribution. In an alternate embodiment, processing logic allocates synergy based on the actual raw volume contributions. However, allocating synergy based on raw volume contributions has drawbacks. For example, for negative synergy, allocating based on raw volume contributions can flip the sign of an activity's volume contribution. Sign flipping call change an activity from a positive volume contribution to a negative volume contribution or vice versa. Thus, sign flipping obscures the qualitative contribution as activity has to the volume. As described above, allocating synergy based on the absolute value of the raw volume contribution does not have the sign flipping problem. Furthermore, raw volume synergy allocation can lead to large amounts of scaling to get a small amount of synergy. As will be described below, this can arise for raw volume contributions of opposite signs. FIG. 8AB are block diagrams that illustrate synergy allocation based on raw volume contributions and the absolute value of the raw volume contributions. In FIG. 8A, diagram 800 comprises volume contributions of two activities 802A-B. In this diagram, raw volume contribution 802A is positive and larger than the negative raw volume contribution. Synergy allocations 804 A-B are allocations that adjust raw volume contribution 802 A-B in opposite directions. The overall allocated synergy is positive because |allocation 804A|>|allocation 804B|. In comparison, in FIG. 8B, diagram 880 comprises raw volume contributions 852A-B and synergy allocations 854A-B. Because the overall synergy allocated is positive and the synergy is allocated based on the absolute value of raw volume contributions 852A-B, synergy allocation 854A-B are both positive and smaller than the corresponding synergy allocation 804A-B in FIG. 8A.

The method described above calculates a volume decomposition for a single predicted volume, e.g., for a single product in a single week and a single location. If a volume decomposition is desired for a set of volumes (multiple Products/Weeks/locations), the volume decompositions for all individual volumes are calculated and the volume contributions to the respective activities are added.

As described above, in one embodiment, a volume decomposition is computed that is independent of that response model by toggling on/off activities. While the decomposition process is described in terms of decomposing a volume, this process, in alternate embodiments, can be used to decompose other measurable business metrics (e.g., revenue, profit or market share, etc.). For example, in one embodiment, processing logic decomposes another measurable business metric and allocates synergy as described in FIGS. 4 and 6 above.

Atomic Decompositions and Decompositions Hierarchies

The volume decomposition described above illustrates a decomposition at one level of granularity, namely the granularity based on the response model and the set of activities. However, businesses are often interested in seeing decompositions at different levels of granularity. For example, what is considered a single activity for the purpose of one report (e.g. Trade Promotions) might be considered as a collection of multiple activities for another business purpose (e.g. Display, Feature, Feature and Display, and TPR). As another example, a single encompassing activity of TV is broken down into one or more individual activities of national TV, local TV, cable, broadcast, daytime, nighttime, etc. However, due to the potential allocation of synergy at different levels of granularity, the level at which activities are defined will have an impact on the volume contribution attributed to a collection of activities. This can lead to inconsistencies between different decomposition reports. Referring back to the example activity groupings, one report for trade can give a different volume contribution overall than the sum of display, feature, feature and display, TPR activity volume contributions.

To avoid these inconsistencies, a fundamental set of "indivisible" or "atomic" activities is defined along with a set of trees describing how to roll up the volume contributions from these atomic activities into aggregate activities. Each level of the tree is called a decomposition level with the level for the leaf nodes being the atomic decomposition level. The sequence of levels starting at the atomic decomposition level is called a decomposition hierarchy. Volume contributions for an activity are obtained by summing the volume contributions of all the atomic activities (leaf nodes) underneath the node associated with this activity. The hierarchy of atomic decomposition level and higher decomposition levels is called a volume decomposition hierarchy.

Figure 9:
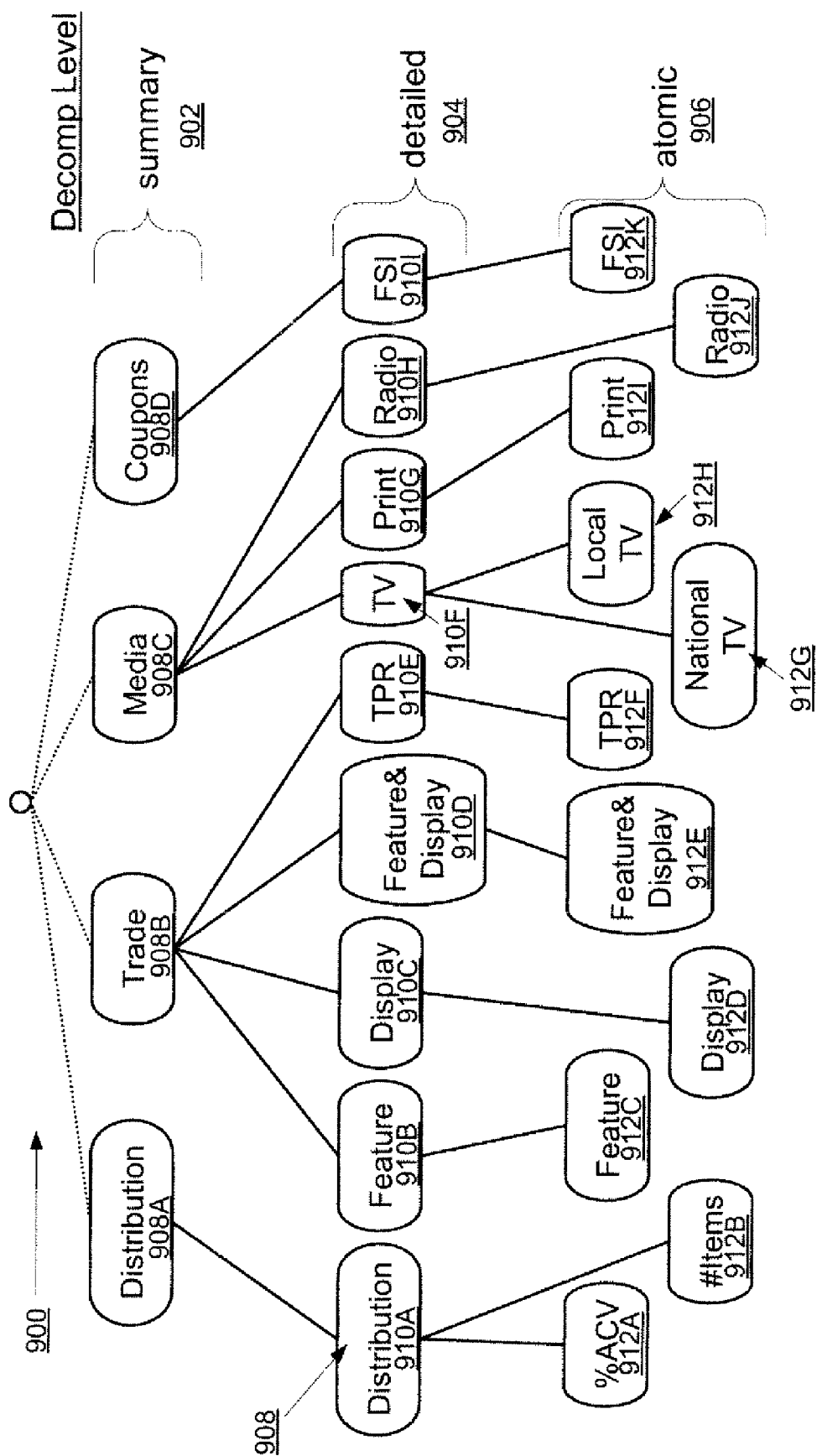
FIG. 9 is a processing block diagram illustrating one embodiment of a volume decomposition hierarchy.

FIG. 9 is a block diagram illustrating one embodiment of a volume decomposition hierarchy 900. In FIG. 9, volume decomposition hierarchy 900 comprises three decomposition levels: summary level 902, detailed level 904, and atomic level 906. While volume decomposition hierarchy 900 is illustrated with three levels, in alternate embodiments, volume decomposition hierarchy 900 has more or less decomposition levels with the same and/or different volume decomposition levels. In particular, volume decomposition hierarchy 900 can have more than one summary level and/or detailed level.

Atomic decomposition level 906 is the lowest level of volume decomposition hierarchy 900 and comprises the finest granularity of activities. Atomic decomposition level 906 comprises activities 912A-K which are % ACV 912A, number of items 912B, feature 912C, display 912D, feature and display 912E, TPR 912F, National TV 912G, local TV 912H, print 912I, radio 912J, and FSI 912K. This decomposition level serves as a base for the detailed 904 and summary 902 decomposition levels.

Detailed decomposition level 904 is a volume decomposition level that is an aggregation of the activities in the atomic decomposition level 906, Detailed decomposition level 904 comprises activities 910A-I which are distribution 910A, feature 910B, display 910C, feature and display 910D, TPR 910E, TV 910F, print 910G, radio 910H, and FSI 910I. The activities 910A-I in detailed decomposition level 904 are composed of one or more activities 912A-K from the atomic decomposition level 906. For example, distribution 910A comprises % ACV 912A and number of items 912B. Furthermore, feature 910B, display 910C, feature and display 910D, TPR 910E comprise each of feature 912C, display 912D, feature and display 912E, and TPR 912F, respectively. TV 910F comprises national TV 912G and local TV 912H.

Summary decomposition level 902 is the highest decomposition level in the volume decomposition hierarchy and presents a volume decomposition of the least number of activities. In one embodiment, summary decomposition level 902 represents a volume decomposition due to a category of broad activities 908A-D. In one embodiment, summary decomposition level 902 comprises activities 908A-D, which are distribution 908A, trade 908B, media 908C, and coupons 908D. Each of these activities 908A-D are composed of finer granular activities from the decomposition level 904 that is below the summary decomposition level 902. For example, distribution 908A comprises distribution 910A. Trade 908B comprises feature 910B, display 910C, feature and display 910D, and TPR 910E activities. Media 908C summarizes media advertising activities and comprises TV 910F, print 9100G, and radio 910H activities. Coupons 908D summarizes coupon activity and comprises FSI 910I.

Using this hierarchy of volume decomposition 900, an analyst can use the high level decomposition 902 to get an overview of which activities 908A-D) give which contributions to the changes in the volume. This analyst or a different analyst can drill down to the detailed 904 or atomic 906 volume decompositions to get a finer granularity of the activity contributions. In addition, because the volume decompositions are built upon atomic volume decomposition 902, each of volume decompositions 904 and 906 are consistent with each other and atomic volume decomposition 902. Thus, an analyst can choose the volume decomposition granularity level that best suits the needs of the analyst. In one embodiment, these volume decomposition levels are consistent because the volume contributions at each level have the same total synergy and add to the same total volume contribution.

Figure 10:
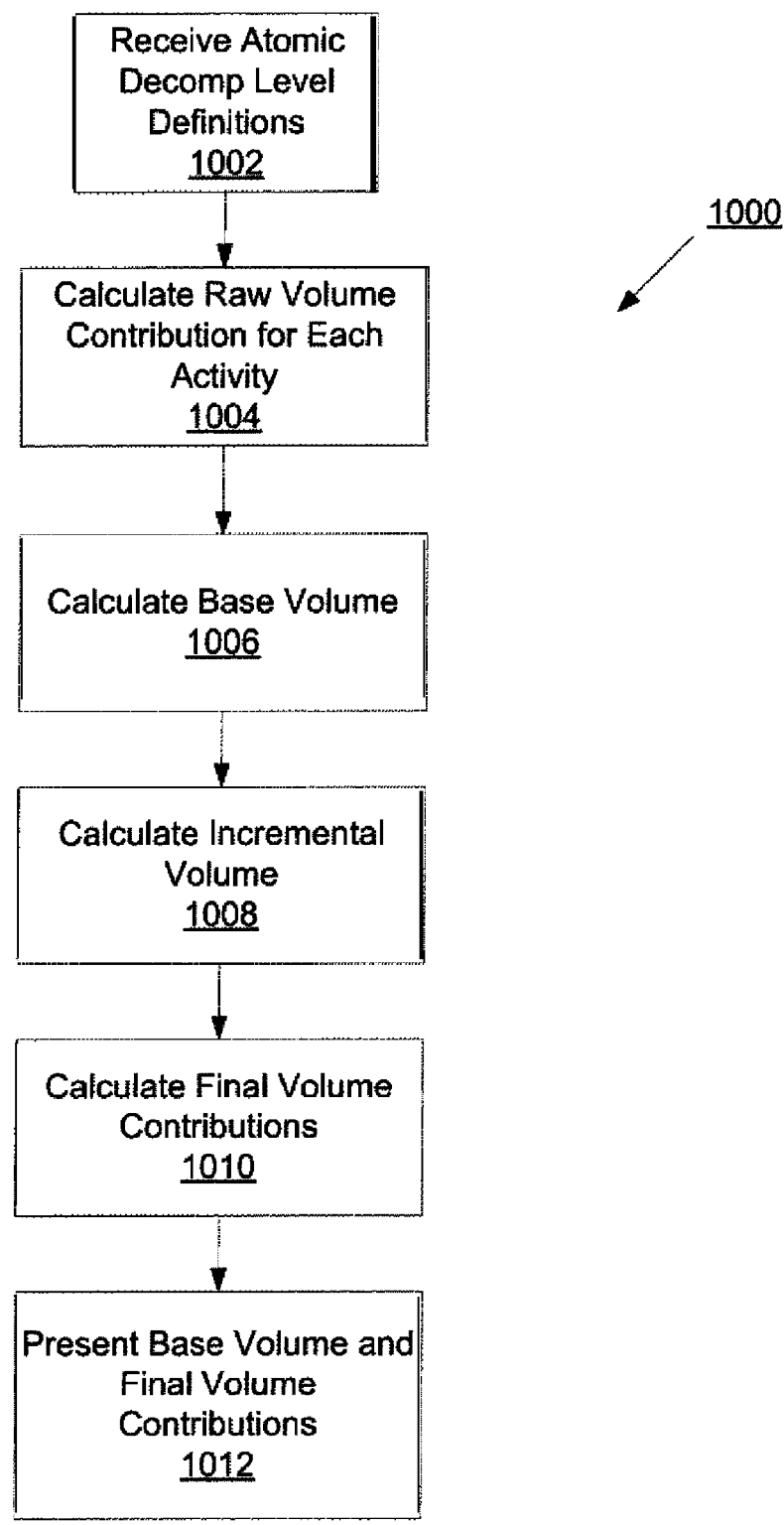
FIG. 10 is a flow diagram of one embodiment of a process for calculating a volume decomposition report for the atomic decomposition level.

FIG. 10 is a flow diagram of one embodiment of a process 1000 for calculating a volume decomposition report for the atomic decomposition level. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 1000 is performed by data processing system 1800 of FIG. 18.

Referring to FIG. 10, at processing block 1002, the process begins by processing logic accessing the defined set of atomic activities. As per above, the defined set of atomic activities is the indivisible set of activities for this response model. The defined set of activities is further described in FIG. 11 below. Processing logic calculates raw volume contribution for each of the atomic activities at processing block 1004. In one embodiment, processing logic calculates the raw volume contributions using additive or subtractive schemes, as described above in FIG. 4 at processing blocks 410-418.

At processing block 1006, processing logic calculates the base volume using the response model. In one embodiment, processing logic calculates the base volume by turning all the atomic activities off as described in FIG. 4, processing block 408 described above. Processing logic calculates the incremental volume from the base and expected volumes at processing block 1008. In one embodiment, processing logic calculates the incremental volume as described in FIG. 4, processing block 406.

At processing block 1010, processing logic calculates the final volume contributions for each of the atomic activities. In one embodiment, processing logic calculates the final volume contributions by allocating the calculated synergy as described in FIG. 4, processing block 420 above. Processing logic presents the base volume and final volume contributions at processing block 1012. In one embodiment, processing logic presents this data graphically, in a table, or in another scheme known in the art.

Figure 11:
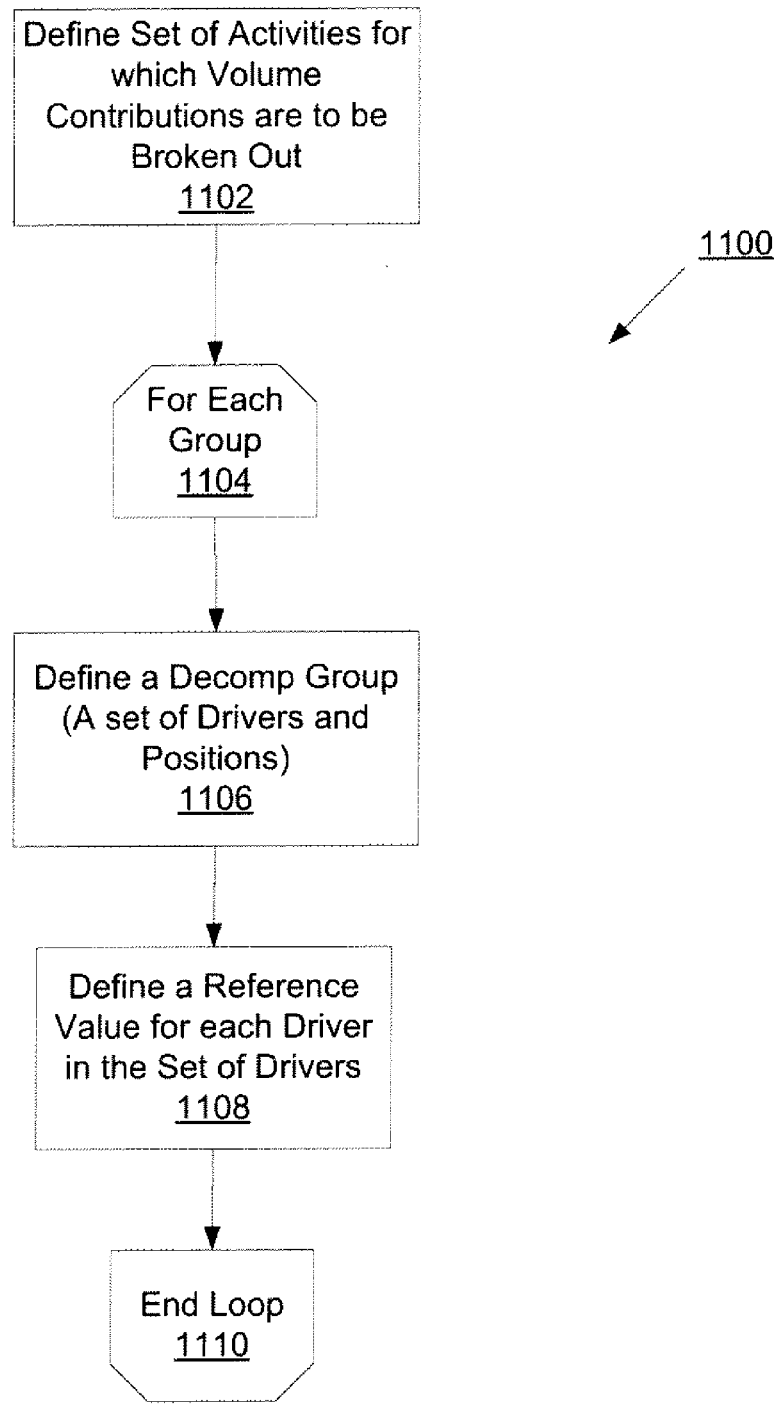
FIG. 11 is a flow diagram of one embodiment of a process for determining an atomic decomposition level.

With the atomic decomposition level calculated, higher volume decomposition levels is defined and/or calculated. FIG. 11 is a flow diagram of one embodiment of a process 1100 for determining higher volume decomposition levels based on the atomic volume decomposition levels. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 1100 is performed by data processing system 1800 of FIG. 18.

Referring to FIG. 11, at processing block 1102, the process begins by processing logic accessing the set of activities for which volume contributions are to be broken out. Processing logic executes a processing loop (processing blocks 1104-1110) to calculate a raw volume contribution for each activity. At processing block 1106, processing logic defines higher level volume decomposition groups. In one embodiment, processing logic defines a higher volume decomposition group by defining a new set of activities from a lower set of activities. The lower set of activities is the atomic set of activities or a set of activities higher in the volume decomposition hierarchy than the atomic volume decomposition and lower than the set of activities being defined. For example, in FIG. 9, processing logic defines activities 910A-I for detailed volume decomposition level 904 based on activities 912A-K from the atomic volume decomposition level 906. Processing logic defines a set of reference values for each of the drivers in the defined volume decomposition group. The processing loop ends at processing block 1110.

Figure 12:
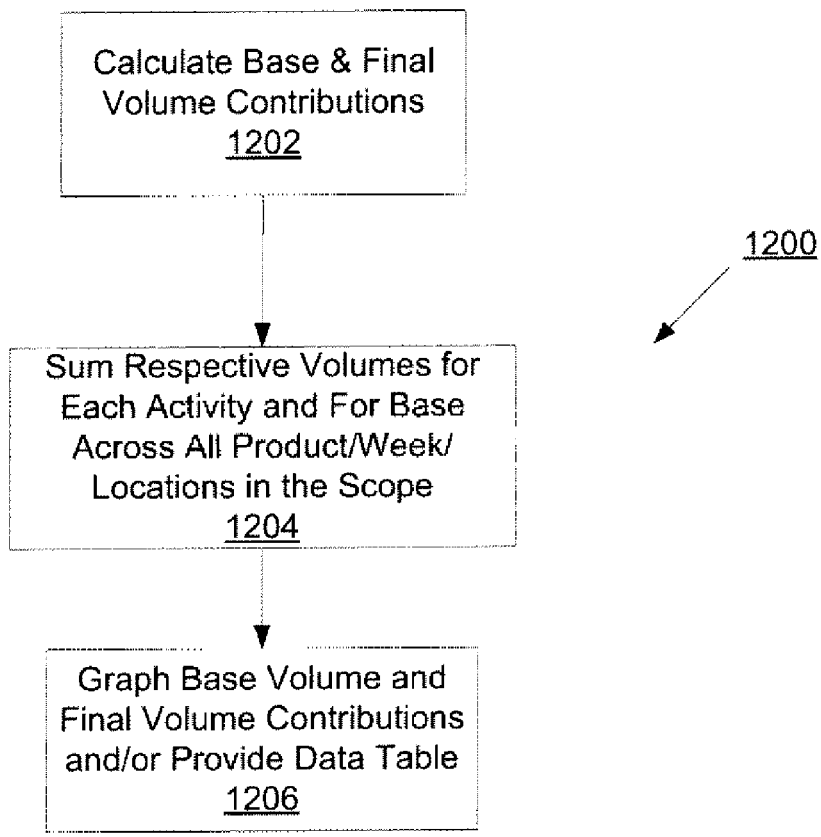
FIG. 12 is a flow diagram of one embodiment of a process for calculating a volume decomposition report for aggregate scopes of the atomic decomposition level.

With the different volume decomposition levels defined, the volume decomposition hierarchy is calculated as described in FIGS. 12 and 13 below. FIG. 12 is a flow diagram of one embodiment of a process 1200 for calculating a volume decomposition report for aggregate scopes for the atomic decomposition level. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 1200 is performed by data processing system 1800 of FIG. 18.

Referring to FIG. 12, at processing block 1202, the process begins by processing logic calculating the base volume and the final volume contributions for the atomic volume decomposition level. In one embodiment, processing logic calculates the base volume and final volume contribution as described FIG. 4 above. Processing logic sums the respective volume contributions for each activity for the base across product/week/locations in the scope at processing block 1204. Processing logic presents the base volume and final volume contributions at processing block 1012. In one embodiment, processing logic presents this data graphically, in a table, or in another scheme known in the art.

Figure 13:
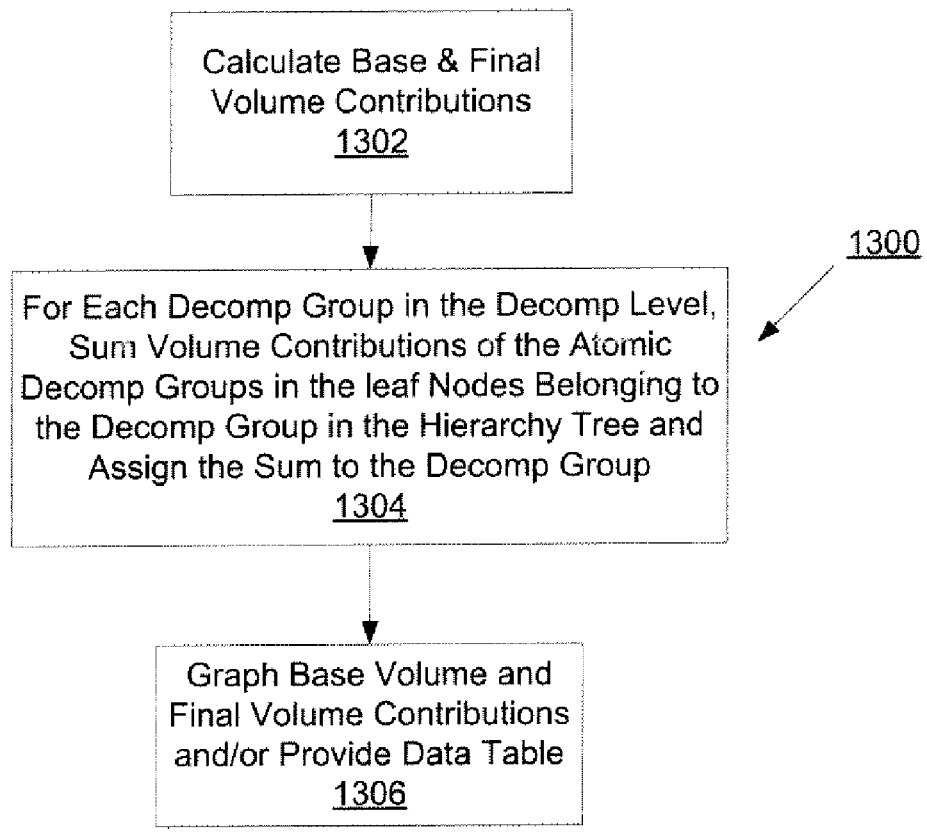
FIG. 13 is a flow diagram of one embodiment of a process for calculating a volume decomposition report for aggregate scopes of decomposition levels higher in the decomposition hierarchy.

FIG. 13 is a flow diagram of one embodiment of a process 1300 for calculating a volume decomposition report for aggregate scopes for decomposition levels higher in the decomposition hierarchy. The process may be performed by processing logic that may comprise hardware (e.g., circuitry, dedicated logic, programmable logic, microcode, etc.), software (such as run on a general purpose computer system or a dedicated machine, or a combination of both. In one embodiment, process 400 is performed by data processing system 1800 of FIG. 18.

Referring to FIG. 13, at processing block 1302, the process begins by processing logic calculating the base volume and the final volume contributions for the atomic volume decomposition level. In one embodiment, processing logic calculates the base volume and final volume contribution as described FIG. 4 above.

At processing block 1304, for each volume decomposition group, processing logic sums the volume contributions of the atomic volume decomposition groups in the leaf nodes belonging to the volume decomposition group in the hierarchy. In one embodiment, each leaf nodes is an activity of one of the volume decomposition levels. Furthermore, processing logic assigns this sum to this volume decomposition group. Processing logic presents the base volume and final volume contributions at processing block 1012. In one embodiment, processing logic presents this data graphically, in a table, or in another scheme known in the art.

In one embodiment, an atomic decomposition level and decomposition hierarchy of volume decomposition levels is described that results in a set of internally consistent set of volume decomposition levels. The atomic decomposition level represents a set of activities that are indivisible and are used to build upon other sets of activities and volume decomposition levels that are internally consistent with the atomic decomposition level.

While the atomic decomposition and decomposition hierarchy is described in terms of decomposing a volume, this process, in alternate embodiments, can be used to calculate atomic decompositions and decomposition hierarchies for other measurable business metrics (e.g., revenue, profit or market share, etc.). For example, in one embodiment, processing logic calculates an atomic decomposition and/or decomposition hierarchy for another measurable business metric as described in FIGS. 10-13 above.

Hybrid Due-To Reports

The volume decomposition and volume decomposition hierarchy described above attempt to answer the question "What activities contribute to a sales volume (or other measurable business metrics)?" While the volume decomposition is applied to one or more products, time period and/or locations, the volume decomposition is typically applied when modeling a single sales volume figure. Another type of report, a "due-to," determines the volume contributions due to differences in volumes between two different time periods. Thus, a due-to attempts to answer the question "Why is the volume up/down?" and determine how much of the volume change is attributable to each of the specific activities. In one embodiment, the due-to report is particularly useful when analyzing changes in volume for the same set of products over different time periods, such as comparing year-to-year sales volumes.

Figure 15:
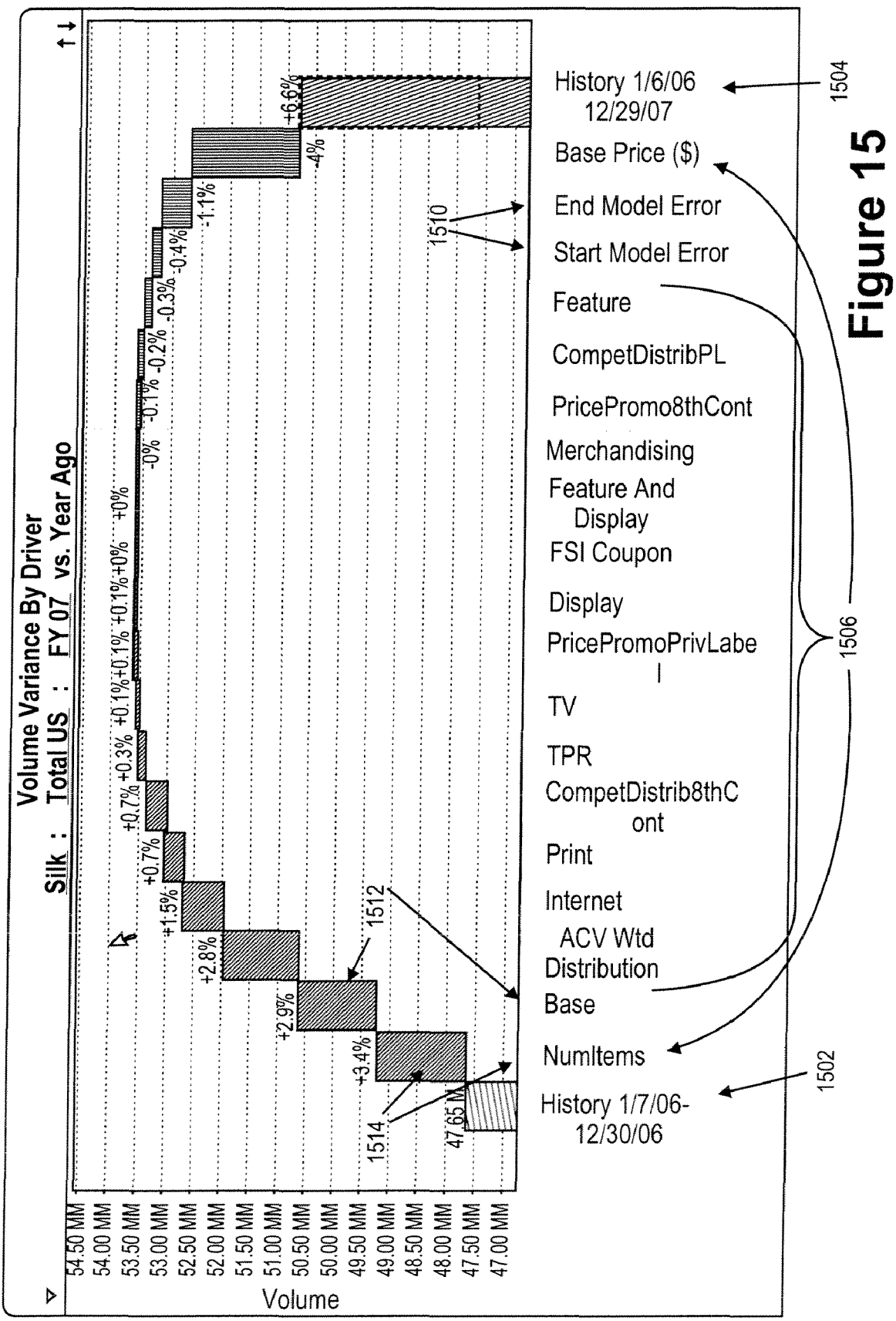
FIG. 15 is a block diagram illustrating one embodiment of the different predicted volumes for different time periods.

An analyst typically would want to know which activity change caused the volume changes. FIG. 15 is a chart illustrating one embodiment of a due-to report 1500. In FIG. 15, due-to report 1500 comprises a starting volume 1502, ending volume 1504, volume contribution changes 1506, base volume change 1512, and model error 1510. Starting volume 1502 is the volume from the starting time period and ending volume 1504 is the volume from the ending time period. Due-to report 1500 presents the change in starting 1502 and ending 1504 volumes as comprising changes in each of the activities volume contribution and the change in the base volume contribution. For example, in FIG. 15, the change in the base volume 1512 adds +2.98% to starting volume 1502.

Furthermore, in FIG. 15, changes in the activities volumes 1506 can be positive, negative, and/or zero, and range from −4% to +3.48%. For example, the volume change attributable to activity NumItems is +3.48%. The model error 1510 add −0.4% and −1.1% to the change in volume contribution.

As is known in the art, one scheme to calculate a due-to reports is to calculate volume decomposition reports for the starting and ending volumes and determine the differences in each activity from these reports. This scheme is known in the art as difference decomposition due-to report. The difference decomposition due-to asks the question "how did the volume contributions from my activities change?"

Difference decompositions are calculated as the difference—activity by activity—of volume contributions in a decomposition in time period two and a decomposition in time period one. However, difference decomposition due-tos have the disadvantage that certain activities that cannot naturally be decomposed and are therefore part of the base volume in decomposition. In one embodiment, some activities do not have a natural reference value and cannot be naturally included in a volume decomposition. Examples of such activities are base price or distribution. As a result, difference decomposition due-tos show these effects as base changes without breaking them out.

Independent of whether an activity is based on drivers with or without reference values, a due-to is calculated using the start and end value of these activities. This is called a hybrid due-to. The hybrid due-to asks the question "How did the change in the activity levels change the volume?" It compares what would have happened had the analyst not changed the plan to what happened under the changed plan and attributes the difference to the chances in activities.

The first step in calculating a hybrid due-to is to determining the change in base volume between the two time periods. This change in base volume results from temporal fluctuations in sales volume that occur without being directly caused by a firm's marketing activities and/or from activities that are not modeled in the response model. Note that volume contributions can change even if activities do not change. For example, volume may increase based on word of mouth advertising by a client base or the popularity of a set of products may increase/decrease naturally. This is due to changes in volume that resulted from driver changes not associated with activities, i.e. base changes.

Figure 14:
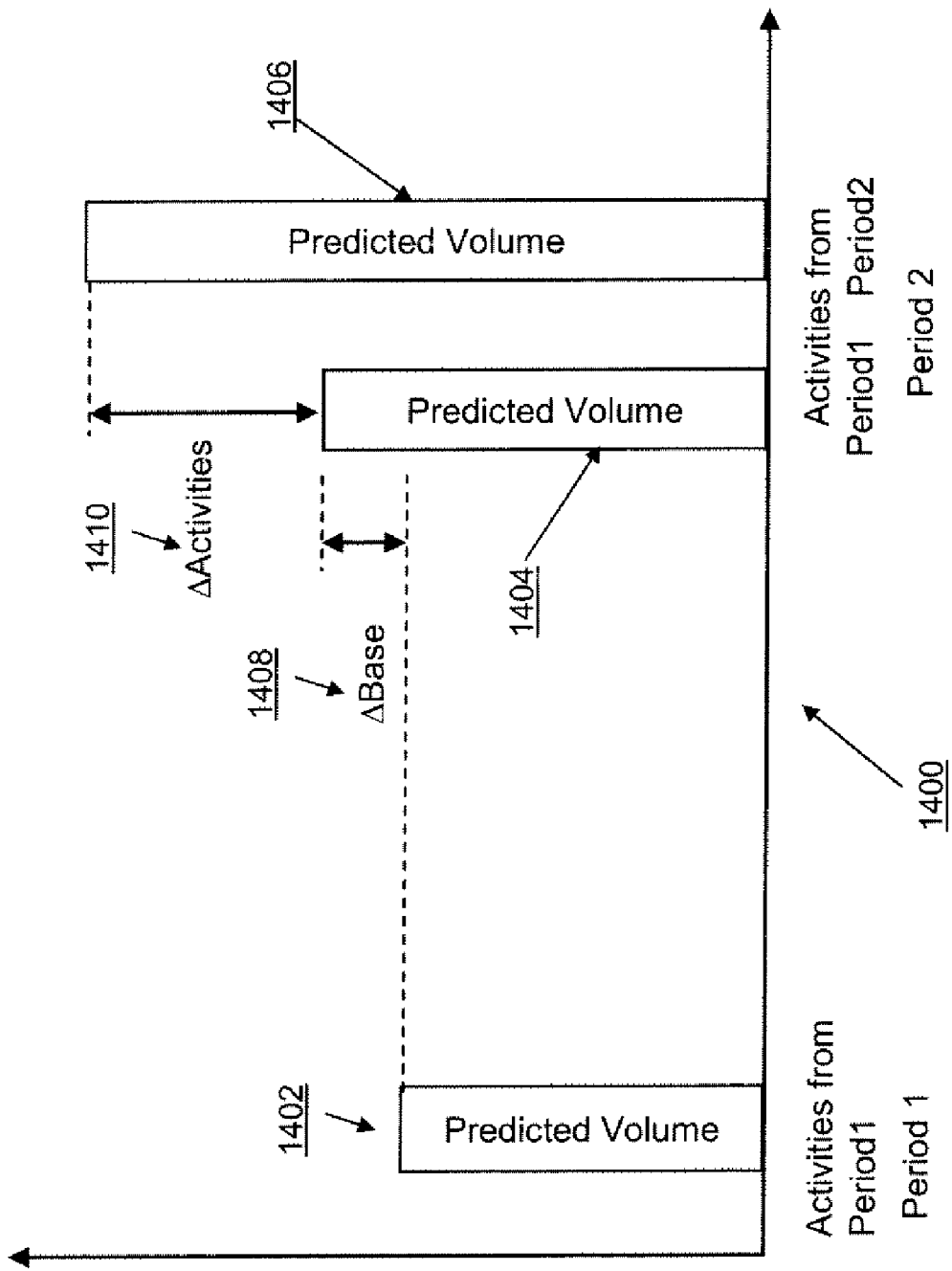
FIG. 14 is a chart illustrating one embodiment of a due-to report.

FIG. 14 is a block diagram 1400 illustrating one embodiment of different predicted volumes for different time periods along with the changes attributable to a change in base volume and activities. In FIG. 14, starting volume 1402 is the volume in period 1 (P1) and ending volume 1406 is the volume period 2 (P2), both predicted based on the activities that were executed in periods 1 and 2 respectively. In diagram 1400, ending volume 1406 is greater than starting volume 1402. We can also predict the volume for period 2 had we executed the same activities as we executed in period 2, resulting in the volume noted by 1404. The difference between volumes 1404 and 1402 is the change in base volume between the two periods. The changes in volume 1406 and 1402 are attributable to changes in the base volume 1404 and changes due to the activities 1410. Volume 1404 represents the volume 1402 corrected for the change in base. After adjusting for the change in base volume, the rest of the volume change is attributable to the change in activities 1410.

The raw volumes to be attributed to the changes in activity is calculated by using the driver values in P1 as the decomposition reference values and executing one of the decomposition algorithms (e.g., additive, subtractive). In addition, synergy is allocated in any of the ways described above. The changes in volume contribution are also called a volume variance.

In this embodiment, the drivers in this model have a value defined in period 1. For that reason, even drivers without an explicit reference value have a reference value in the hybrid due-to algorithm and, therefore, will have a volume contribution broken out.

Figure 16:
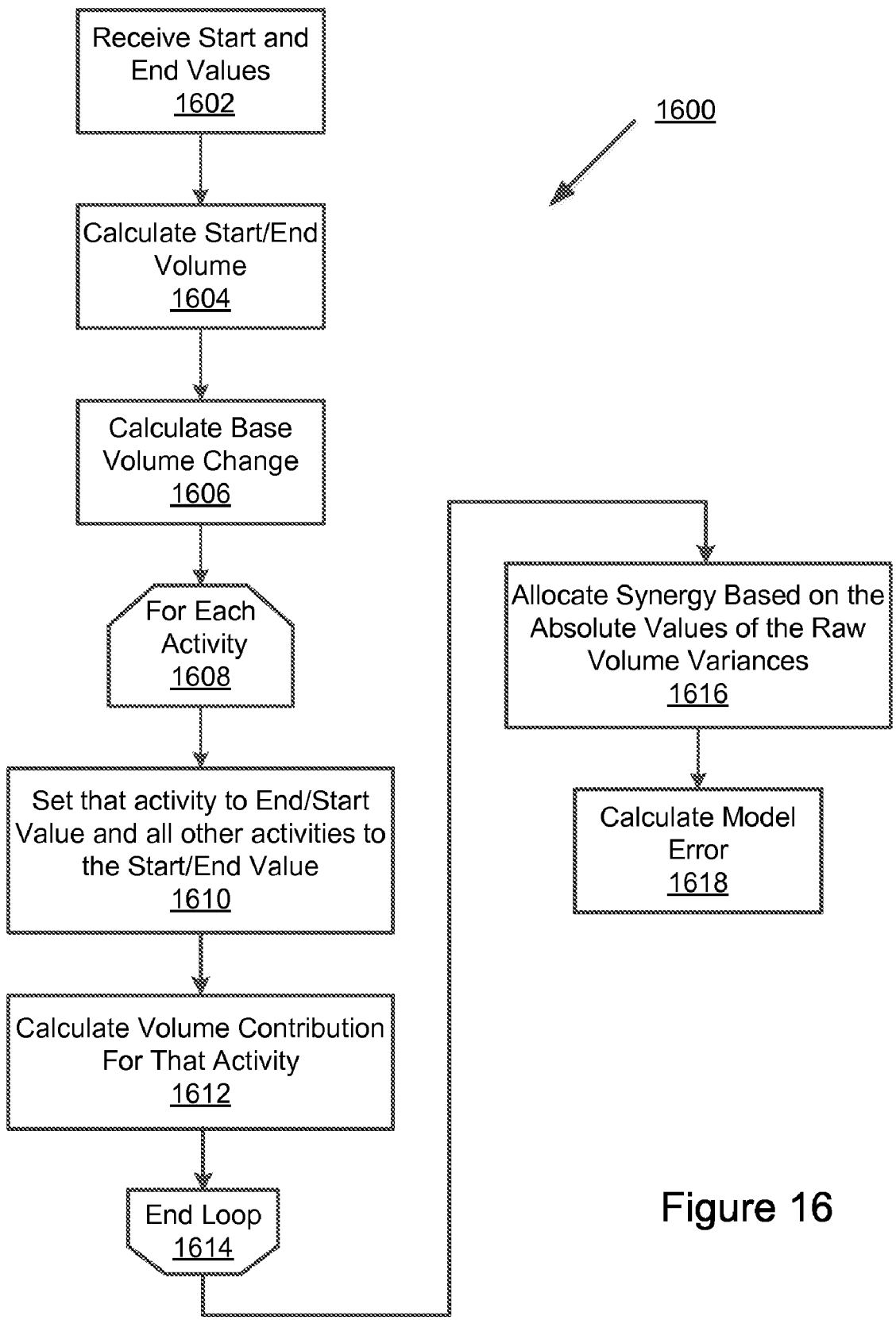
FIG. 16 is a flow diagram of one embodiment of a process for calculating a hybrid due-to and allocating synergy.

FIG. 16 is a flow diagram of one embodiment of a process 1600 for calculating a hybrid due-to and allocating synergy. The process may be performed by processing logic that may comprise hardware (e.g. circuitry, dedicated logic, programmable logic, microcode, etc.). software (such as run on a general purpose computer system or a dedicated machine), or a combination of both. In one embodiment, process 1600 is performed by data processing system 1800 of FIG. 18.

Referring to FIG. 16, at processing block 1602, the process begins by processing logic accessing the start/end volume and activity values and other input information used in this process (response model, etc.). Processing logic calculates the start and end volumes at processing block 1604. In one embodiment, processing logic calculates the start and end volumes as described in FIG. 4, processing block 406.

At processing block 1606, processing logic calculates the change in base volume. As described above, the change in base volume can result from temporal fluctuation in sales volume that occurs naturally and/or from activities that are not modeled in the response model. In one embodiment, processing logic calculates the change in base volume by calculating one the predicted volume for one period (e.g., end or start volume) using the executed activities of the other period (e.g., start or end executed activities). The difference between these two predicted volumes is the change in base volume.

Processing logic executes a processing loop (processing blocks 1608-1614) to calculate the change in volume contribution for each of the activities. At processing block 1610, processing logic sets an activity to one of the start and end value and all of the other activities to the other sets of values. For example, if processing logic sets one activity to the start value, processing logic sets all the other activities to the end value. Using this setup, processing logic calculates the volume contribution for the activity that has the different start/end value. In one embodiment, processing logic calculates the volume contribution by taking the difference between the volume calculated with the different start/end value and the corresponding start/end volume. Examples of this type of calculation are further described in reference with Tables 1-10 below. The processing loop ends at processing block 1614.

At processing block 1616, processing logic allocates the synergy to the set of volume contributions calculated in the processing loop above. In one embodiment, processing logic allocates a portion of the calculated synergy for each of the activity volume variances based on the absolute values of the raw volume variances. In one embodiment, let $V_1, V_2, \ldots V_n$ be the raw volume variances of those activities that are being allocated a portion of the calculated synergy and let S be the calculated synergy to be allocated. In one embodiment, the final volume variance for each activity i is computed using Eq. (13).

$$V_i^{Final} = V_i + \frac{|V_i|}{\sum_{j=1}^{n}|V_j|} \cdot S. \quad (13)$$

where $V_i^{Final}$ is the final volume variance for an activity i, $V_i$ is the raw volume variance for activity i, and S is the total calculated synergy. Processing logic calculates the model error at processing block 1618.

The example given below illustrates, in one embodiment, how processing logic determines volume "due-to" changes by creating cubes that contain some drivers from both Start and End states. In this example, the set of activities modeled includes marketing, trade, price, and distribution. The marketing activity comprises the driver TV. The trade activity comprises drivers TPR_Price and TPR_ACV. The Price activity comprises drivers NoPromoPrice and AverageNoPromoPrice. The distribution activity comprise driver ACV. The following model is used with these activities to calculate volume (Eq. (14)):

$$\text{Volume} = (1.5)*(TV) + (2000)* \quad (14)$$
$$(AverageNoPromoPrice - TPR\_Price)*TPR\_ACV/ACV +$$
$$(1000)*(AverageNoPromoPrice - NoPromoPrice)*$$
$$(ACV - TPR\_ACV)/ACV + (150)*(ACV)$$

Furthermore, in this example, the subtractive form of the decomposition scheme is used along with the absolute synergy allocation scheme. In other embodiments, other schemes are used.

Table 1 illustrates the comparison of the start and end driver values for the activities of marketing, trade, price, and distribution.

TABLE 1

Start and End Driver Values.

| Activity | Drivers | Start Cube Drivers | End Cube Drivers |
|---|---|---|---|
| Marketing | TV | 100 | 60 |
| Trade | TPR_Price | 2.1 | 2.30 |
|  | TPR_ACV | 20 | 15 |
| Price | NoPromoPrice | 3.90 | 4.20 |
|  | AverageNoPromoPrice | 4.10 | 4.10 |
| Distribution | ACV | 40 | 50 |

With the end driver values, processing logic calculates the end volume. The end volume is 8,600 units of volume as illustrated in Table 2.

TABLE 2

Calculating the End Volume.

| Activity | Driver Names | Driver Values | Result |
|---|---|---|---|
| Marketing | TV | 60 | 90 |
| Trade | TPR_Price | 2.30 | 1,080 |
|  | TPR_ACV | 15 | 0 |
| Price | NoPromoPrice | 4.20 | −70 |
|  | AverageNoPromoPrice | 4.10 | 0 |
| Distribution | ACV | 50 | 7,500 |
| Volume |  |  | 8,600 |

Processing logic calculates each of the raw volume contributions by toggling each activity from the end value to the start value and recomputing the volume with this configuration. For example, processing logic toggles the market value by setting TV driver to 100. The resulting volume is 8660, or a change of 60 (Table 3).

TABLE 3

Calculating the Volume for the Marketing Activity with the Starting Driver Value.

| Activity | Driver Names | Driver Values | Result | EndCubeResult − CurrentResult |
|---|---|---|---|---|
| Marketing | TV | 100 | 150 | −60 |
| Trade | TPR_Price | 2.30 | 1,080 | 0 |
|  | TPR_ACV | 15 | 0 | 0 |
| Price | NoPromoPrice | 4.20 | −70 | 0 |
|  | AverageNoPromoPrice | 4.10 | 0 | 0 |

TABLE 3-continued

Calculating the Volume for the Marketing Activity with the Starting Driver Value.

| Activity | Driver Names | Driver Values | Result | EndCubeResult − CurrentResult |
|---|---|---|---|---|
| Distribution | ACV | 50 | 7,500 | 0 |
| Volume | | | 8,660 | −60 |

For the trade activity raw volume contribution, processing logic restores the marketing activity to the end driver value and sets the trade activity to the start value. In this example, processing logic sets the drivers of trade, TPR_Price and TPR_ACV, to 2.1 and 20, respectively. The calculated volume is 9,130 which is a change of −530 (Table 4).

TABLE 4

Calculating the Volume for the Trade Activity with the Starting Driver Values.

| Activity | Driver Names | Driver Values | Result | EndCubeResult − CurrentResult |
|---|---|---|---|---|
| Marketing | TV | 60 | 90 | 0 |
| Trade | TPR_Price | 2.1 | 1,600 | −520 |
| | TPR_ACV | 20 | 0 | 0 |
| Price | NoPromoPrice | 4.20 | −60 | −10 |
| | AverageNoPromoPrice | 4.10 | 0 | 0 |
| Distribution | ACV | 50 | 7,500 | 0 |
| Volume | | | 9,130 | −530 |

For the price activity, processing logic restores the trade activity to the end driver values and sets the price activity to the start driver values. In this example, processing logic sets the price drivers, NoPromoPrice and AverageNoPromoPrice, to 3.90 and 4.10, respectively. The calculated volume is 8,810, which is a change of −210 (Table 5).

TABLE 5

Calculating the Volume for the Price Activity with the Starting Driver Values.

| Activity | Driver Names | Driver Values | Result | EndCubeResult − CurrentResult |
|---|---|---|---|---|
| Marketing | TV | 60 | 90 | 0 |
| Trade | TPR_Price | 2.30 | 1,080 | 0 |
| | TPR_ACV | 15 | 0 | 0 |
| Price | NoPromoPrice | 3.90 | 140 | −210 |
| | AverageNoPromoPrice | 4.10 | 0 | 0 |
| Distribution | ACV | 50 | 7,500 | 0 |
| Volume | | | 8,810 | −210 |

For the distribution activity, processing logic restores the price activity to the end driver values and sets the distribution activity to the start driver values. In this example, processing logic sets the price driver, ACV, to 40. The calculated volume is 7,378, which is a change of 1223 (Table 6).

TABLE 6

Calculating the Volume for the Distribution Activity with the Starting Driver Values.

| Activity | Driver Names | Driver Values | Result | EndCubeResult − CurrentResult |
|---|---|---|---|---|
| Marketing | TV | 60 | 90 | 0 |
| Trade | TPR_Price | 2.30 | 1,350 | −270 |
| | TPR_ACV | 15 | 0 | 0 |
| Price | NoPromoPrice | 4.20 | −63 | −8 |
| | AverageNoPromoPrice | 4.10 | 0 | 0 |
| Distribution | ACV | 40 | 6,000 | 1,500 |
| Volume | | | 7,378 | 1,223 |

Furthermore, processing logic calculates the start volume using the start driver values, which results in a volume of 8,250 and a difference of 350 from the end volume (Table 7).

TABLE 7

Start Volume and Start Volume/End Volume Difference.

| Activity | Driver Names | Driver Values | Result | EndCubeResult − CurrentResult |
|---|---|---|---|---|
| Marketing | TV | 100 | 150 | −60 |
| Trade | TPR_Price | 2.1 | 2,000 | −920 |
| | TPR_ACV | 20 | 0 | 0 |
| Price | NoPromoPrice | 3.90 | 100 | −170 |
| | AverageNoPromoPrice | 4.10 | 0 | 0 |
| Distribution | ACV | 40 | 6,000 | 1,500 |
| Volume | | | 8,250 | 350 |

However, the sum of the initial volume contributions is 423 (Table 8). This is indicates there is 73 units of synergy that is allocated to the individual volume contributions.

TABLE 8

Individual Volume Contributions, no Synergy Allocated.

| Activity | Driver Names | Per Activity Volume Delta |
|---|---|---|
| Marketing | TV | −60 |
| Trade | TPR_Price | −530 |
| | TPR_ACV | |
| Price | NoPromoPrice | −210 |
| | AverageNoPromoPrice | |
| Distribution | ACV | 1223 |
| Total | | 423 |

Using the absolute synergy allocation scheme as described above in FIG. 6, the final volume contributions are listed in Table 9, For example, for the marketing activity, the incremental volume is −60, absolute value is 60, sum of the absolute value for each activity is 2023, and the total synergy is −73. The allocated portion of the total synergy is −2.2 using Eq. (7) to calculate the synergy allocation for the marketing activity. The final incremental volume for the marketing activity is −62.2.

TABLE 9

Synergy Allocation and Final Volume Contributions including Synergy.

| Activity | Driver Names | Per Activity Volume Delta | End Total − Start Total | Synergy | ABS (Activity) | Per Activity Adjust. | Per Activity Volume Delta |
|---|---|---|---|---|---|---|---|
| Marketing | TV | −60 | | | 60 | −2.2 | −62.2 |
| Trade | TPR_Price | −530 | | | 530 | −19.1 | −549.1 |
| | TPR_ACV | | | | | 0.0 | 0.0 |
| Price | NoPromoPrice | −210 | | | 210 | −7.6 | −217.6 |
| | AverageNoPromoPrice | | | | | 0.0 | 0.0 |
| Distribution | ACV | 1223 | | | 1223 | −44.1 | 1,178.9 |
| Total | | | 423 | 350 | −73 | 2023 | −73 | 350 |

The Final results are listed in Table 10.

TABLE 10

Final Results.

| Activity | Driver Names | Start Cube | Gross Per Activity Delta | Net Per Activity Delta | End Cube |
|---|---|---|---|---|---|
| Marketing | TV | | −60 | −62.2 | |
| Trade | TPR_Price | | −530 | −549.1 | |
| | TPR_ACV | | | 0.0 | |
| Price | NoPromoPrice | | −210 | −217.6 | |
| | AverageNoPromoPrice | | | 0.0 | |
| Distribution | ACV | | 1223 | 1,178.9 | |
| Total | | 8,250 | | 350 | 8,600 |

As described above, in one embodiment, a hybrid due-to report is calculated that determines the volume variance between two different volumes for a set of activities that do not have a reference values. Furthermore, in other embodiments, the hybrid due-to is applied to other sets of activities (activities that do have a reference value, distribution activities, etc.).

In another embodiment, multiple levels of volume variances are computed based on a defined set of atomic activities, a decomposition hierarchy that includes a tree of activities, and a hybrid due-to. In this embodiment, processing logic computes an atomic volume variance level using the defined set of atomic activities as described in FIG. 16 above. Using this atomic volume variance level, processing logic computes higher levels of volume variance levels based on other sets of activities that are based on the defined set of atomic activities as described in FIGS. 11-13. In this embodiment, the volume variances are summed instead of volume contributions.

While the hybrid due-to is described in terms of calculating a volume variance, this process, in alternate embodiments, can be used to calculate calculating variances for other measurable business metrics (e.g., revenue, profit or market share, etc.), For example, in one embodiment, processing logic calculates a volume variance for another measurable business metric as described in FIG. 16 above.

Compound Due-to Reports

Figure 17:
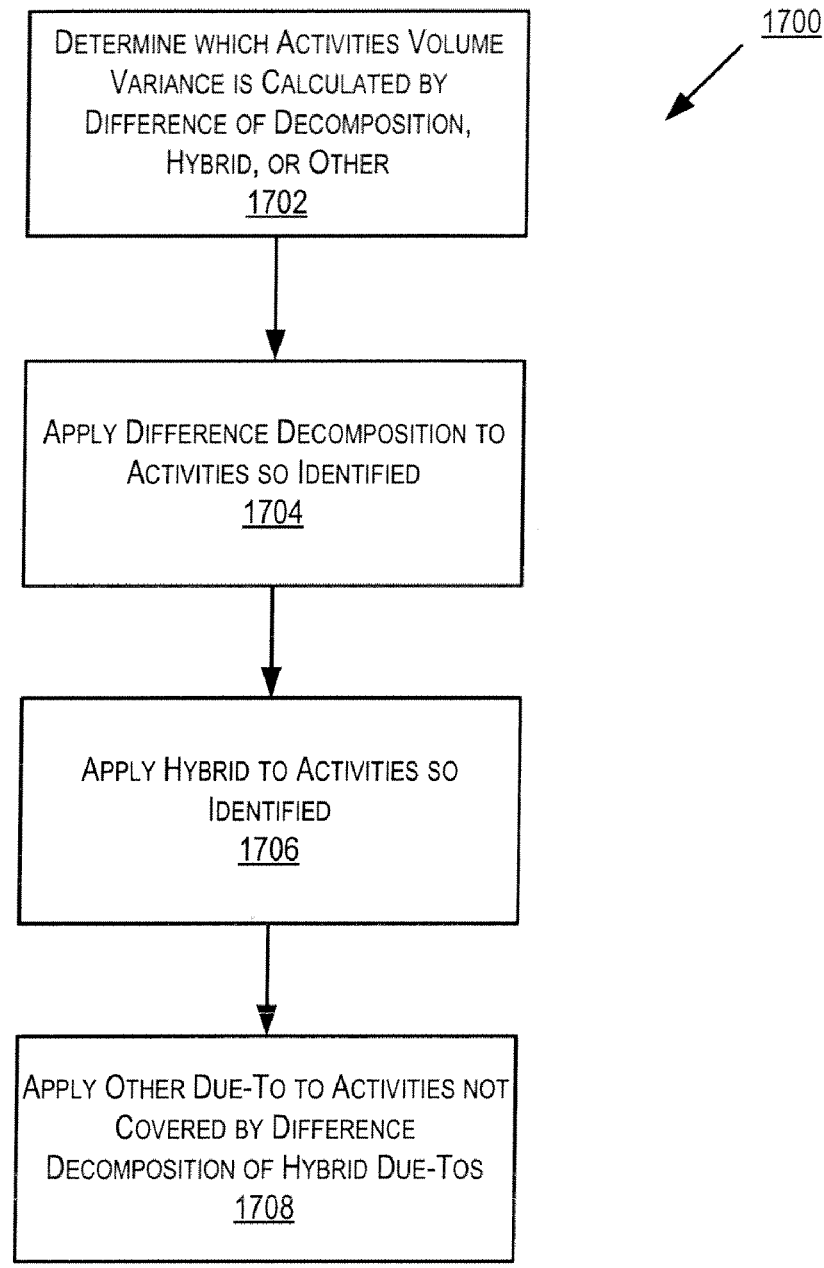

As described above, due-to reports are calculated using difference decomposition or hybrid schemes. Difference decompositions due-to reports is calculated only for activities whose drivers have an appropriate reference value, whereas hybrid due-to reports is used for activities that do or do not have an appropriate reference value. In some cases, users prefer the interpretation of "change in volume contribution of an activity" provided by the difference of decompositions method over the interpretation "change of volume due to change of activity" of the hybrid method. In order to retain the ability to provide volume variance reports across these sets of activities, in one embodiment, these two schemes are combined for calculating the due-to reports. In this embodiment, the difference decomposition is applied to activities that have drivers with a natural reference value, hybrid is applied to non-distribution activities that do not have drivers with a natural reference value, and volume changes resulting from the distribution activities are calculated by subtraction. FIG. 17 is a flow diagram of one embodiment of a process 1700 for calculating a compound due-to. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 700 is performed by data processing system 1800 of FIG. 18.

Referring to FIG. 17, at processing block 1702, the process begins by processing logic determining the sets of activities that will be calculated by difference decomposition, hybrid, or other. In one embodiment, processing logic calculates the volume contributions for activities with drivers with a natural reference value using difference decomposition. Furthermore, processing logic calculates the volume contributions for all other non-distribution activities using the hybrid scheme. Distribution activities will be calculated by subtracting the difference decomposition and hybrid results from the start/end volume difference.

For example, in one embodiment, consider a response model consisting of the following activities: TV, trade, price, base price, and distribution. For this set of activities, TV and trade have a reference value, whereas price, base price, and distribution do not. In a compound scheme to calculate the due-to report, TV and trade would be calculated using difference decomposition, price and base price would be calculated using hybrid, and distribution would be calculated by subtraction (Table 11).

TABLE 11

Calculation Scheme for Each of the Activities.

| "Bucket" | Calculation Phase |
|---|---|
| TV | DD |
| Trade | DD |
| Price | H |
| Base | H |
| Distribution | Subtraction |

During each of the phases of calculation, the drivers not active during that phase are treated as if they were not of interest to the due-to report. As a result, effects of those drivers will be part of the base volume as described in (Table 12). The overall base volume is the set of unassigned activities as declared in the decomposition level. An effective base is the set of activities that are be treated in a base-like fashion during each phase of the calculation. Activities that are not in the effective base for a phase of the calculation will toggle their driver values. In the difference decomposition phase, the declared base gets lumped into the effective base. In this embodiment, the drivers that are part of the effective base are not toggle in calculating the respective decompositions. In the hybrid phase, the declared base is treated differently from the declared base in the decomposition phase. This means that the drivers in the hybrid declared base are toggled between the two different values.

TABLE 12

Effective Bases for each of the Activities.

| Buckets as Declared | Buckets as used in DiffD | Buckets as used in Hybrid |
|---|---|---|
| TV | $TV_{DD}$ | $EffectiveBase_H$ |
| Trade | $Trade_{DD}$ | $EffectiveBase_H$ |
| Price | $EffectiveBase_{DD}$ | $Price_H$ |
| Base | $EffectiveBase_{DD}$ | $Base_H$ |
| Distribution | $EffectiveBase_{DD}$ | $EffectiveBase_H$ |

At processing block 1704, processing logic applies difference decomposition for the activities that have a natural reference value. In one embodiment, processing logic calculates a volume decomposition for each of the start and end scenarios. Using these two volume decompositions, processing logic calculates a volume variance for each of the activities by taking the difference of the two volume decompositions. Furthermore, processing logic could allocate a portion of any calculated synergy for each of the volume variances.

In the example of activities given in Table 11, processing logic would use the difference decomposition interpretation of the decomposition level ($TV_{DD}$, $Trade_{DD}$, and EffectiveBaseDD) and perform calculation using difference decomposition. Note that for this calculation that activities in $EffectivefBase_{DD}$ (price base, and distribution) do not toggle. Processing logic calculates the synergy using Eq. (15):

$$(V_{TV_{DD}} + V_{Trade_{DD}}) - V_{TV_{DD}\text{-and-}Trade_{DD}} \quad (15)$$

where $V_{TV_{DD}}$ is the calculated volume with the TV in the reference value, $V_{Trade_{DD}}$ is the calculated volume with trade in the reference value, and $V_{TV_{DD}\text{-and-}Trade_{DD}}$ is the calculated volume with TV and trade in the reference values. Processing logic can allocate the synergy in this step or in a later step.

At processing block 1706, processing logic applies the hybrid scheme for the activities that do not have a natural reference value and are not distribution activities. In one embodiment, processing logic calculates a volume variance using the hybrid scheme as described in FIG. 16. As applied to the activities in Table 11, processing logic would use the hybrid scheme for price and base price and perform the hybrid calculation. In this embodiment, the activities (TV and trade) in $EffectiveBase_H$ do not toggle. Processing logic calculates the synergy using Eq. (16):

$$(V_{Price_H} + V_{Base_H}) - V_{Price_H\text{-and-}Base_H} \quad (16)$$

where $V_{Price_H}$ is the calculated volume for the price in one of the start/end state, $V_{Base_H}$ is the calculated volume for base price in one of the start/end state, and $V_{Price_H\text{-and-}Base_H}$ is the calculated volume with price and base price in one of the start/end state. Processing logic can allocate the synergy in this step or in a later step.

At processing block 1708, processing logic calculates volume variance for the distribution activities by subtracting the other volume variances calculated in processing blocks 1704 and 1706 from the total predicted volume as in Eq. (17):

$$VV_{Dist} = V_{Predicted} - \Sigma VV_i - Synergy_{DD} - Synergy_H \quad (17)$$

where $VV_{Dist}$ is the distribution volume variance, $V_{Predicted}$ is the predicted volume, $\Sigma VV_i$ is sum of the volume variances calculated using the difference decomposition and hybrid schemes, $Synergy_{DD}$ is the synergy calculated using difference decomposition, and $Synergy_H$ is the synergy calculated using the hybrid scheme.

In an alternate embodiment, processing logic calculates a compound due-to without using the subtraction phase. In this embodiment, processing logic calculates the volume contributions from those activities that are assigned to the difference of decomposition group (DD) using the difference of decomposition method.

TABLE 13

Calculation Scheme for Each of the Activities in a Compound Due-to without Subtraction.

| "Bucket" | Calculation Phase |
|---|---|
| TV | DD |
| Trade | DD |
| Price | H |
| Distribution | H |

The drivers associated with the activities in DD are set to their decomposition values in the two time periods. The result is a new model predicting volume without the DD activities' contribution. Applying a hybrid due-to algorithm to this new model with respect to those activities not assigned to DD provides both the volume contributions of the non-DD activities as well as the change in base volume.

In more detail, the compound due-to without subtraction is calculated in the following three steps:
1. Calculate the decompositions for both time periods with respect to the activities in DD. Taking the differences between the corresponding raw volume contributions gives the raw volume contributions for these activities
2. Setting all the drivers that correspond to the activities in DD to their reference values provides a new model. A hybrid due-to is calculated based on this model. For example, the hybrid due-to is calculated as described in FIG. 16 above. This due-to provides the raw volume contributions for the activities in the hybrid due-to as well as the change in base volume.
3. Synergy (the difference between the sum of all the raw volume contributions and the difference in predicted volumes) is allocated by one of the mechanisms described above.

In another embodiment, multiple levels of volume variances are computed based on a defined set of atomic activities, a decomposition hierarchy that includes a tree of activities, and a compound due-to. In this embodiment, processing logic computes an atomic volume variance level using the defined set of atomic activities as described in FIG. 17 above. Using this atomic volume variance level, processing logic computes higher levels of volume variance levels based on other sets of activities that are based on the defined set of atomic activities as described in FIGS. 11-13. In this embodiment, the volume variances are summed instead of volume contributions.

While the compound due-to is described in terms of calculating a volume variance, this process, in alternate embodiments, can be used to calculate atomic decompositions and decomposition hierarchies for other measurable business metrics (e.g., revenue, profit or market share, etc.). For example, in one embodiment, processing logic calculates an atomic decomposition and/or decomposition hierarchy for another measurable business metric as described in FIGS. 10-13 above.

Figure 18:
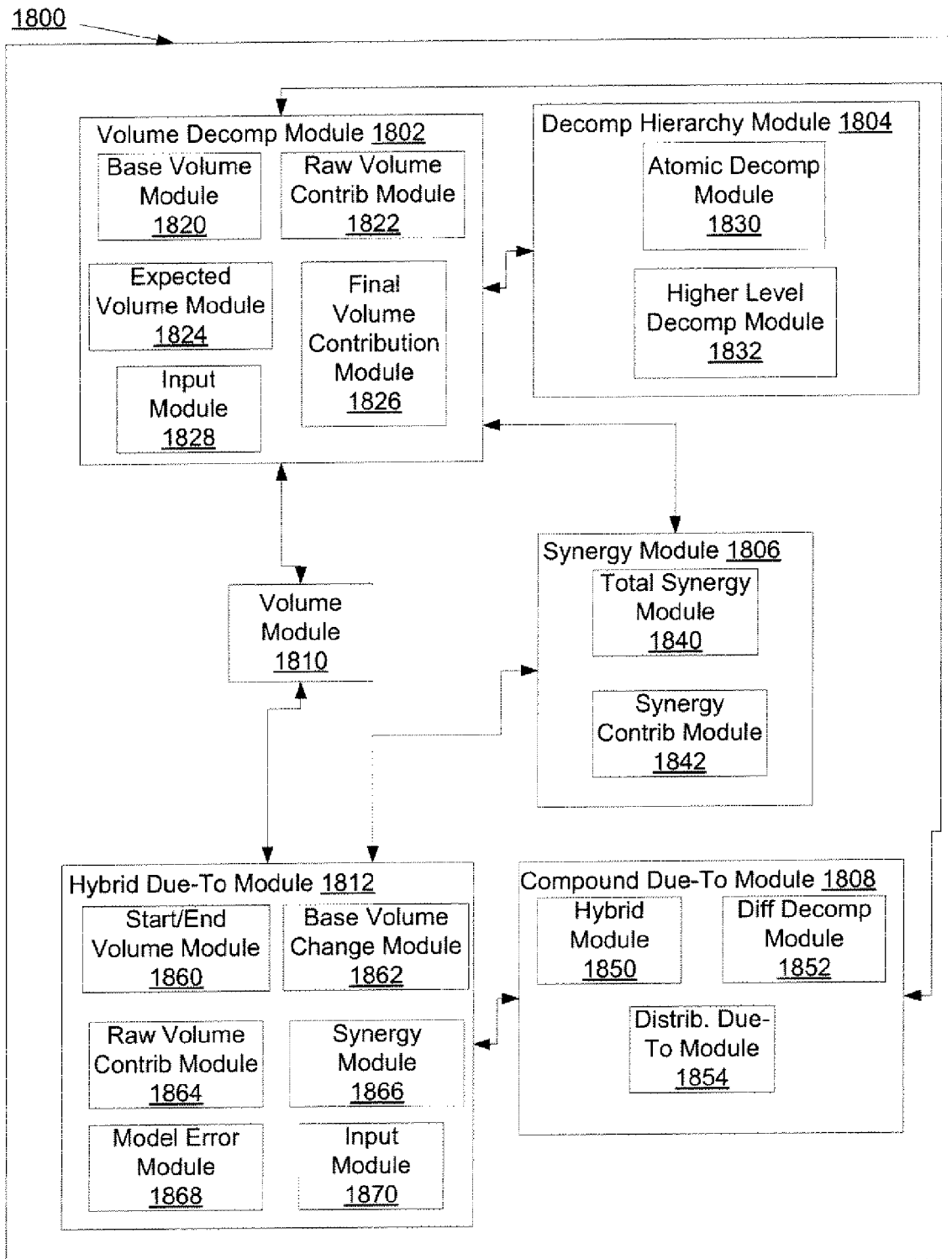
FIG. 18 is a diagram of one embodiment of a data processing system that calculates volume decomposition reports, atomic decompositions, volume decomposition hierarchies, hybrid due-to reports, and/or compound due-to reports.

FIG. 18 is a block diagram of a data processing system 800 that calculates volume decompositions, atomic decompositions/volume decomposition hierarchies, hybrid due-tos, and/or compound due-tos. Data processing system is, but not limited to, a general-purpose computer, a multiprocessor computer, several computers coupled by a network, etc. In FIG. 18, system 1800 comprises volume decomposition module 1802, decomposition hierarchy module 1804, synergy module 1806, compound due-to module 1808, volume module 1810, and hybrid due-to module 1812. Volume module 1810 accesses inputs and calculates a volume results. In one embodiment, inputs comprise the response model, the set of activities and the values for each of those activities as described in FIG. 2. In one embodiment, volume decomposition module 1802 and hybrid due-to module 1812 direct volume module to calculate one or more of the base volume, expected volumes, volume contributions, etc. Synergy module 1806 calculates and allocates the synergy as described in FIG. 7. In one embodiment, volume decomposition module 1802 and hybrid due-to module 1812 direct volume module to calculate and allocate the synergy.

Volume decomposition module 1802 comprises base volume module 1820, raw volume contribution module 1822, expected volume module 1824, final volume contribution module 1826, and input module 1828. Base volume module 1820 calculates the base volume as described in FIG. 1, processing block 406. Raw volume contribution module 1822 calculates the raw volume contributions for each of the activities with a reference value as described in FIG. 4, processing blocks 410-418. Expected volume module 1824 calculates the expected volume as described in FIG. 4, processing block 406. In one embodiment, base volume module 1820, raw volume contribution module 1822, and expected volume modules direct volume module 1810 to calculate the appropriate volume. Final volume contribution 1826 adds determines the allocated synergy and adds it to each of the raw volume contributions as described FIG. 4, processing block 420. In one embodiment, final volume module 1826 uses synergy module 1806 to determine the synergy allocations. Input module accesses the inputs as described in FIG. 4, processing block 402.

Decomposition hierarchy module 1804 comprises atomic decomposition module 1830 and higher level decomposition module 1832. Atomic decomposition module 1830 defines and calculates an atomic decomposition level as described in FIG. 10. Higher level decomposition module 1832 calculates levels of volume decompositions based on the atomic decomposition as described in FIGS. 11-13.

Synergy module 1806 comprises total synergy module 1840, and synergy contribution module 1842. Total synergy module 1840 calculates the total synergy based on an incremental volume and raw volume contributions as described in FIG. 6, processing block 604. Synergy contribution module 1842 determines the individual synergy contribution for each of the input activities as described in FIG. 6, processing block 606. In one embodiment, synergy contribution module 1842 determines the individual synergy contribution based on the absolute value of each raw volume contribution.

Compound due-to module 1810 comprises hybrid module 1850, difference decomposition module 1852, and distribution due-to module 1854. Hybrid module calculates the volume variance for non-distribution activities that do not have a reference value as described in FIG. 17, processing block 1706, Difference decomposition module 1852 calculates the volume variance for non-distribution activities that have a reference values as described in FIG. 17, processing block 1704. Distribution due-to module 1854 calculates the volume variance for distribution activities as described in FIG. 17, processing block 1708.

Hybrid Due-to module 1812 comprises start/end volume module 1860, base volume module change module 1862, raw volume contribution module 1864, synergy module 1866, model error module 1868, and input module 1870. Start/end volume module calculates the start and end volume as described in FIG. 16, processing block 1604. Base change volume module 1862 calculates the base volume change as described in FIG. 16, processing block 1606. Raw volume contribution module calculates the raw volume contribution change as described in FIG. 16, processing blocks 1608-1614. Synergy module 1866 calculates the synergy for each of the activities as described in FIG. 16, processing block 1616. Model error module 1868 calculates the model error as described in FIG. 16, processing block 1618. Input module 1870 access the input parameters as described in FIG. 16, processing block 1602.

The method described above calculates a due-to report for a single matched pair of predicted volumes (scenarios), e.g. for a single product in single location for two different weeks. If a due-to report is desired for a set matched pairs of scenarios (e.g. multiple Products/Locations for two different weeks), the due-to report for all individual volumes are calculated and the volume contributions to the respective activities are added.

The processes described herein may constitute one or more programs made up of machine-executable instructions. Describing the process with reference to the flow diagrams in FIGS. 4, 6, 10-13, 16, and 17 enables one skilled in the art to develop such programs, including such instructions to carry out the operations (acts) represented by logical processing blocks on suitably configured machines (the processor of the machine executing the instructions from machine-readable media, such as RAM (e.g. DRAM), ROM, nonvolatile storage media (e.g. hard drive or CD-ROM), etc.). The machine-executable instructions may be written in a computer programming language or may be embodied in firmware logic or in hardware circuitry. If written in a programming language conforming to a recognized standard, such instructions are executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the processes illustrated in the flow diagrams without departing from the scope of the invention and that no particular order is implied by the arrangement of blocks shown and described herein.

Figure 19:
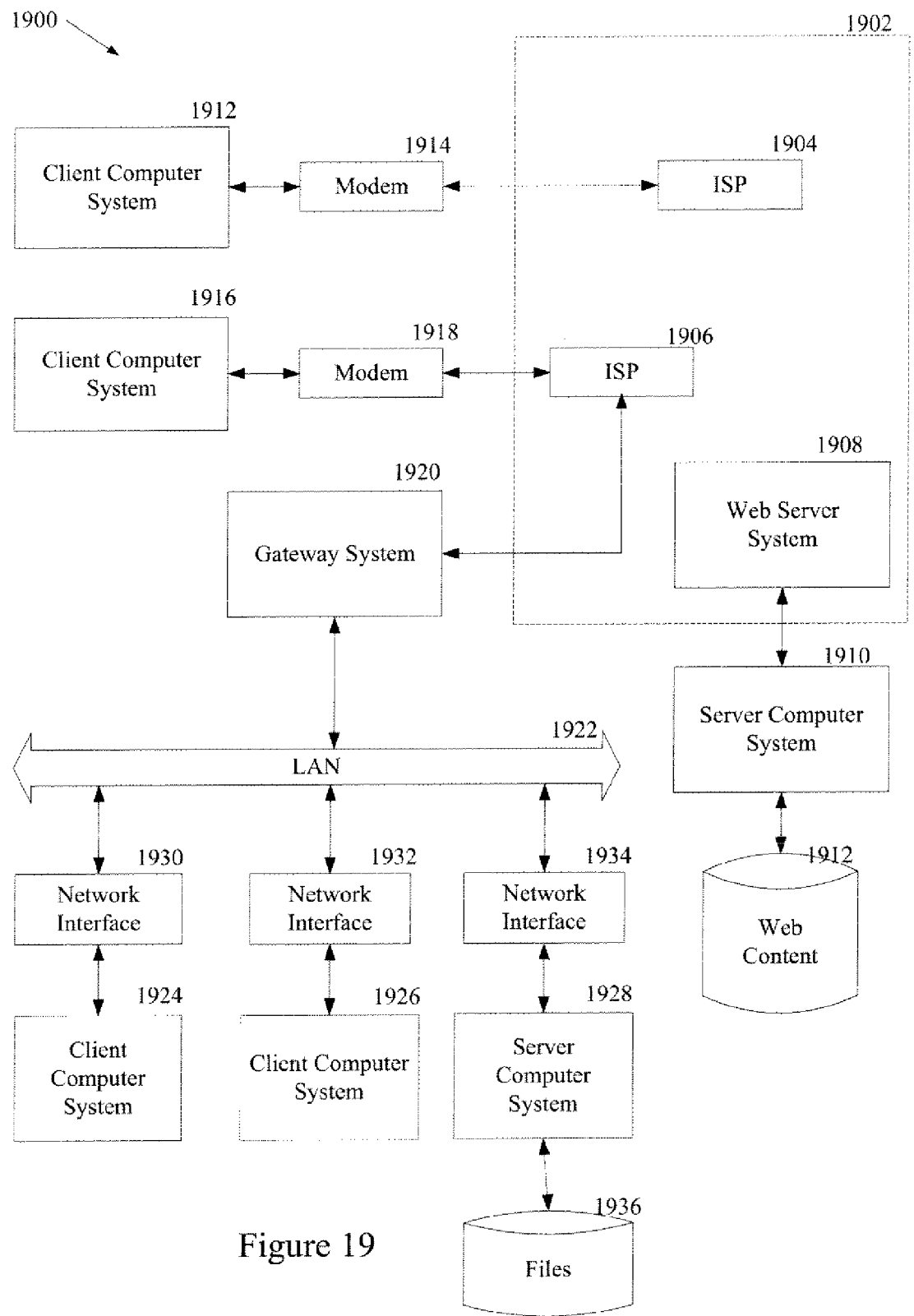
FIG. 19 is a diagram of one embodiment of an operating environment suitable for practicing the present invention.

FIG. 19 shows several computer systems 1900 that are coupled together through a network 1902, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 1902 is typically provided by Internet service providers (ISP), such as the ISPs 1904 and 1906. Users on client systems, such as client computer systems 1912, 1916, 1924, and 1926 obtain access to the Internet through the Internet service providers, such as ISPs 1904 and 1906. Access to the Internet allows users of the client computer systems to exchange information, receive and send e-mails, and view documents, such as documents which have been prepared in the HTML format. These documents are often provided by web servers, such as web server 1908 which is considered to be "on" the Internet. Often these web servers are provided by the ISPs, such as ISP 1904, although a computer system can be set up and connected to the Internet without that system being also an ISP as is well known in the art.

The web server 1908 is typically at least one computer system which operates as a server computer system and is configured to operate with the protocols of the World Wide Web and is coupled to the Internet. Optionally, the web server 1908 can be part of an ISP which provides access to the Internet for client systems. The web server 1908 is shown coupled to the server computer system 1910 which itself is coupled to web content 1912, which can be considered a form of a media database. It will be appreciated that while two computer systems 1908 and 1910 are shown in FIG. 19, the web server system 1908 and the server computer system 1910 can be one computer system having different software components providing the web server functionality and the server functionality provided by the server computer system 1910 which will be described further below.

Client computer systems 1912, 1916, 1924, and 1926 can each, with the appropriate web browsing software, view HTML pages provided by the web server 1908. The ISP 1904 provides Internet connectivity to the client computer system 1912 through the modem interface 1914 which can be considered part of the client computer system 1912. The client computer system can be a personal computer system, a network computer, a Web TV system, a handheld device, or other such computer system. Similarly, the ISP 1906 provides Internet connectivity for client systems 1916, 1924, and 1926, although as shown in FIG. 19, the connections are not the same for these three computer systems. Client computer system 11916 is coupled through a modem interface 1918 while client computer systems 1924 and 1926 are part of a LAN. While FIG. 19 shows the interfaces 1914 and 1918 as generically as a "modem," it will be appreciated that each of these interfaces can be an analog modem, ISDN modem, cable modem, satellite transmission interface, or other interfaces for coupling a computer system to other computer systems. Client computer systems 1924 and 1916 are coupled to a LAN 1922 through network interfaces 1930 and 1932, which can be Ethernet network or other network interfaces. The LAN 1922 is also coupled to a gateway computer system 1920 which can provide firewall and other Internet related services for the local area network. This gateway computer system 1920 is coupled to the ISP 1906 to provide Internet connectivity to the client computer systems 1924 and 1926. The gateway computer system 1920 can be a conventional server computer system. Also, the web server system 1908 can be a conventional server computer system.

Alternatively, as well-known, a server computer system 1928 can be directly coupled to the LAN 1922 through a network interface 1934 to provide files 1936 and other services to the clients 1924, 1926, without the need to connect to the Internet through the gateway system 1920. Furthermore, any combination of client systems 1912, 1916, 1924, 1926 may be connected together in a peer-to-peer network using LAN 1922, Internet 1902 or a combination as a communications medium. Generally, a peer-to-peer network distributes data across a network of multiple machines for storage and retrieval without the use of a central server or servers. Thus, each peer network node may incorporate the functions of both the client and the server described above.

Figure 20:
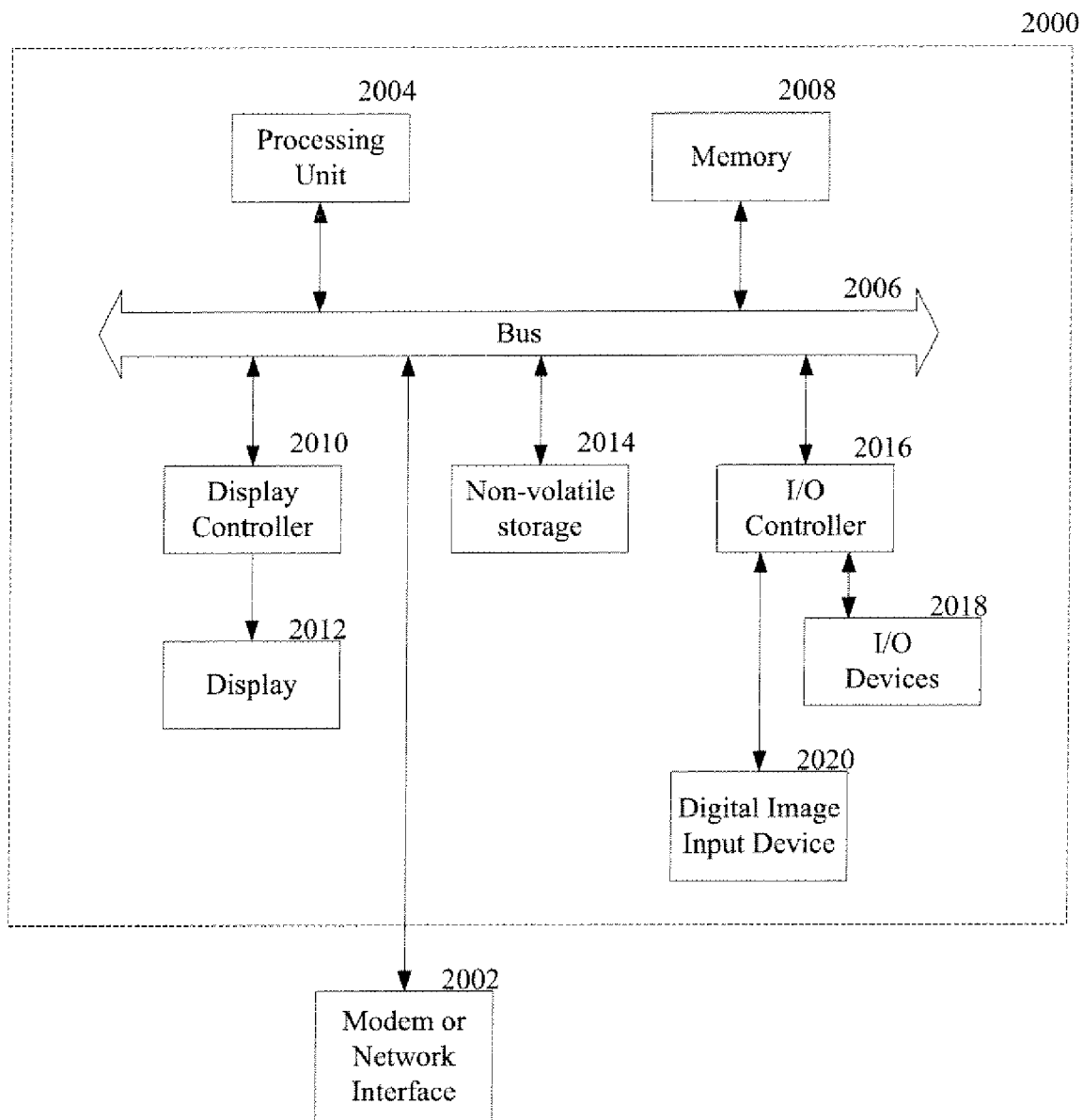
FIG. 20 a diagram of one embodiment of a data processing system, such as a general purpose computer system, suitable for use in the operating environment of FIGS. 4, 6, 10-13, 16, and 17.

The following description of FIG. 20 is intended to provide an overview of computer hardware and other operating components suitable for performing the processes of the invention described above, but are not intended to limit the applicable environments. One of skill in the art will immediately appreciate that the embodiments of the invention can be practiced with other computer system configurations, including set-top boxes, hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 20 shows one example of a conventional computer system that can be used in one or more aspects of the invention. The computer system 2000 interfaces to external systems through the modem or network interface 2002. It will be appreciated that the modem or network interface 2002 can be considered to be part of the computer system 2000. This interface 2002 can be an analog modem, ISDN modem, cable modem, token ring interface, satellite transmission interface, or other interfaces for coupling a computer system to other computer systems. The computer system 2002 includes a processing unit 2004, which can be a conventional microprocessor such as an Intel Pentium microprocessor or Motorola Power PC microprocessor. Memory 2008 is coupled to the processor 2004 by a bus 2006. Memory 2008 can be dynamic random access memory (DRAM) and can also include static RAM (SRAM). The bus 2006 couples the processor 2004 to the memory 2008 and also to non-volatile storage 2014 and to display controller 2010 and to the input/output (I/O) controller 2016. The display controller 2010 controls in the conventional manner a display on a display device 2012 which can be a cathode ray tube (CRT) or liquid crystal display (LCD). The input/output devices 2018 can include a keyboard, disk drives, printers, a scanner, and other input and output devices, including a mouse or other pointing device. The display controller 2010 and the I/O controller 2016 can be implemented with conventional well known technology. A digital image input device 2020 can be a digital camera which is coupled to an I/O controller 2016 in order to allow images from the digital camera to be input into the computer system 2000. The non-volatile storage 2014 is often a magnetic hard disk, an optical disk, or another form of storage for large amounts of data. Some of this data is often written, by a direct memory access process, into memory 2008 during execution of software in the computer system 2000. One of skill in the art will immediately recognize that the terms "computer-readable medium" and "machine-readable medium" include any type of storage device that is accessible by the processor 2004 or by other data processing systems such as cellular telephones or personal digital assistants or MP3 players, etc. and also encompass a carrier wave that encodes a data signal.

Network computers are another type of computer system that can be used with the embodiments of the present invention. Network computers do not usually include a hard disk or other mass storage, and the executable programs are loaded from a network connection into the memory 2008 for execution by the processor 2004. A Web TV system, which is known in the art, is also considered to be a computer system according to the embodiments of the present invention, but it may lack some of the features shown in FIG. 20, such as certain input or output devices. A typical computer system will usually include at least a processor, memory, and a bus coupling the memory to the processor.

It will be appreciated that the computer system 2000 is one example of many possible computer systems, which have different architectures. For example, personal computers based on an Intel microprocessor often have multiple buses, one of which can be an input/output (I/O) bus for the peripherals and one that directly connects the processor 2004 and the memory 2008 (often referred to as a memory bus). The buses are connected together through bridge components that perform any necessary translation due to differing bus protocols.

It will also be appreciated that the computer system 2000 is controlled by operating system software, which includes a file management system, such as a disk operating system, which is part of the operating system software. One example of an operating system software with its associated file management system software is the family of operating systems known as WINDOWS OPERATING SYSTEM from Microsoft Corporation in Redmond, Wash., and their associated file management systems. The file management system is typically stored in the non-volatile storage 2014 and causes the processor 2004 to execute the various acts required by the operating system to input and output data and to store data in memory, including storing files on the non-volatile storage 2014.

ALTERNATIVE EMBODIMENTS

While various embodiments of the invention have been described, alternative embodiments of the invention can operate differently. For instance, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method comprising:
   computing, using a processor, a variance for each of a first set of activities based on the corresponding reference state of that activity, wherein the variance for an activity is the change in contribution for that activity between the first and second business metrics, wherein each of the first set of activities has a reference value and the first set of activities is associated with a first business metric;
   computing, using a processor, a variance for each of a second set of activities based on the corresponding start and end values of that activity, wherein each of the second set of activities has a start and end value and the second set of activities is associated with a second business metric; and
   allocating, using a processor, synergy to the variance for each of the first set of activities and the variance for each of the second set of activities based on an absolute value of raw volume variance.

2. The computer implemented method of claim 1, further comprising:
   defining a third set of activities;
   computing a variance for each of the third set of activities based on the variances of second set of activities and the third set of activities.

3. The computer implemented method of claim 2, wherein the each of the third set of activities is a distribution activity.

4. The computer implemented method of claim 2, wherein computing the variance for the each of the third set of activities is accomplished by subtracting the variance for the first and second set of activities from a difference of the first and second business metrics.

5. The computer implemented method of claim 1, wherein the effective base of the first set of activities includes the second set of activities.

6. The computer implemented method of claim 1, wherein the effective base of the second set of activities includes the first set of activities.

7. The computer implemented method of claim 1, wherein the computing the variance for each of the second set of activities further includes computing the variance with the first set of activities each set to the corresponding reference value.

8. The computer implemented method of claim 7, further comprising:
   computing the change in the effective base of the second set of activities.

9. The computer implemented method of claim 1, wherein the business metric is one of sales volume, revenue, profit, and market share.

10. A computer implemented method comprising:
    accessing a response model and a first and second plurality of activities, the response model and the first and second plurality of activities are used to compute a business metric volume variance, wherein the first and second plurality of activities define an atomic volume variance level of the business metric, wherein each of the first plurality of activities has a reference value and each of the second plurality of activities has a start and an end value, and wherein the atomic volume variance level is a base level of a set of different volume variances using different pluralities of activities and the set of different volume variances is consistent with the atomic volume variance level; and
    allocating, using a processor, synergy to the variance for each of the first plurality of activities and the variance for each of the second plurality of activities based on an absolute value of the atomic volume variance.

11. A machine-readable storage medium having executable instructions to cause a processor to perform a method comprising:
    computing a variance for each of a first set of activities based on the corresponding reference state of that activity, wherein the variance for an activity is the change in contribution for that activity between the first and second business metrics, wherein each of the first set of activities has a reference value and the first set of activities is associated with a first business metric;

computing a variance for each of a second set of activities based on the corresponding start and end values of that activity, wherein each of the second set of activities has a start and end value and the second set of activities is associated with a second business metric; and allocating, using a processor, synergy to the variance for each of the first set of activities and the variance for each of the second set of activities based on an absolute value of raw volume variance.

12. The machine readable storage medium of claim 11, wherein the method further comprises:

defining a third set of activities;

computing a variance for each of the third set of activities based on the variances of second set of activities and the third set of activities.

13. The machine readable storage medium of claim 12, wherein the each of the third set of activities is a distribution activity.

14. The machine readable storage medium of claim 12, wherein computing the variance for the each of the third set of activities is accomplished by subtracting the variance for the first and second set of activities from a difference of the first and second business metrics.

15. An apparatus comprising:

a difference decomposition module, including a processor, to compute a variance for each of a first set of activities based on the corresponding reference state of that activity, wherein the variance for an activity is the change in contribution for that activity between the first and second business metrics, wherein each of the first set of activities has a reference value and the first set of activities is associated with a first business metric;

a hybrid due-to module, including a processor, to compute a variance for each of a second set of activities based on the corresponding start and end values of that activity, wherein each of the second set of activities has a start and end value and the second set of activities is associated with a second business metric; and allocating, using a processor, synergy to the variance for each of the first set of activities and the variance for each of the second set of activities based on an absolute value of raw volume variance.

16. The apparatus of claim 15, further comprising:

a distribution due-to module to compute a variance for each of a third set of activities based on the variances of second set of activities and the third set of activities.

17. The apparatus of claim 15, wherein the each of the third set of activities is a distribution activity.

18. A system comprising:

a processor;

a memory coupled to the processor though a bus: and a process executed from the memory by the processor to cause the processor to, computing a variance for each of a first set of activities based on the corresponding reference state of that activity, wherein the variance for an activity is the change in contribution for that activity between the first and second business metrics, wherein each of the first set of activities has a reference value and the first set of activities is associated with a first business metric;

computing a variance for each of a second set of activities based on the corresponding start and end values of that activity, wherein each of the second set of activities has a start and end value and the second set of activities is associated with a second business metric; and allocating, using a processor, synergy to the variance for each of the first set of activities and the variance for each of the second set of activities based on an absolute value of raw volume variance.

19. The system of claim 18, wherein the process further causes the processor to compute a variance for each of a third set of activities based on the variances of second set of activities and the third set of activities.

20. The system of claim 18, wherein the each of the third set of activities is a distribution activity.

* * * * *